US006274091B1

(12) United States Patent
Mohan et al.

(10) Patent No.: US 6,274,091 B1
(45) Date of Patent: *Aug. 14, 2001

(54) APPARATUS AND PROCESS FOR MULTIPLE CHEMICAL REACTIONS

(75) Inventors: Raju Mohan, Moraga; Brad O. Buckman, Oakland; Michael M. Morrissey, Danville, all of CA (US); Andrew I. Chitty, West Linn; John T. Martin, Milwaukie, both of OR (US)

(73) Assignee: Berlex Laboratories, Inc., Richmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/277,724

(22) Filed: Mar. 29, 1999

Related U.S. Application Data

(63) Continuation of application No. 08/717,797, filed on Sep. 23, 1996, now Pat. No. 5,888,830, and a continuation-in-part of application No. 08/532,279, filed on Sep. 22, 1995, now abandoned.

(51) Int. Cl.$^7$ ...................................... G01N 1/00
(52) U.S. Cl. .................. 422/103; 422/100; 422/101; 422/131; 422/134; 422/138; 436/174; 436/177
(58) Field of Search ................... 422/63, 81, 100, 422/103, 104, 129, 131, 134, 138, 101; 436/43, 180, 183, 174, 177; 137/597, 637

(56) References Cited

U.S. PATENT DOCUMENTS

| | | |
|---|---|---|
| 4,051,205 | 9/1977 | Grant . |
| 4,493,815 | 1/1985 | Fernwood et al. . |
| 4,517,338 | * 5/1985 | Urdea et al. ............... 525/54.11 |
| 4,597,412 | * 7/1986 | Stark ............................ 137/606 |
| 4,598,049 | * 7/1986 | Zelinka et al. .................. 435/287 |

(List continued on next page.)

FOREIGN PATENT DOCUMENTS

| | | |
|---|---|---|
| 40 08 /085 | 9/1991 | (DE) . |
| 0 542 422 | 5/1993 | (EP) . |
| 2177200 | 1/1987 | (GB) . |
| 90/02605 | 3/1990 | (WO) . |
| 91/07504 | 5/1991 | (WO) . |
| 94/18226 | 8/1994 | (WO) . |
| 95/11262 | 4/1995 | (WO) . |
| 95/12608 | 5/1995 | (WO) . |
| 97/023577 | 1/1997 | (WO) . |
| 97/10896 | 3/1997 | (WO) . |

OTHER PUBLICATIONS

Gausepohl et al., "Multiple Reaction System for Automated Simultaneous Peptide Synthesis," *Proceedings of the Twenty–First European Peptide Symposium*, Platia d'Aro, Spain, pp. 206–207 (Sep. 2–8, 1990).
Patent Abstracts of Japan, vol. 8, No. 86 (p–269) (Apr. 19, 1994).
*Pharmaceutical Sciences*, 1990, Chapter 104, p. 1878.
*Dorland's Illustrated Medical Dictionary*, Twenty–sixth Edition, 1981, pp. 459 and 759.
Gennaro, Alfonso R., *Remington's*, 18$^{th}$ Edition, p. 1302.

Primary Examiner—Long V. Le
(74) Attorney, Agent, or Firm—Millen, White, Zelano & Branigan

(57) ABSTRACT

Multiple chemical reactions are performed in a plurality of reaction vessels mounted in inlets in a manifold valve block. The manifold valve block is connected to a channel block which is utilized in conjunction with a solvent delivery system as part of the reaction cycle. The solvent fluid is drained from the reaction vessels when valves in the manifold valve block are opened while applying a vacuum thereto. Optionally, a thermal block may be utilized in conjunction with the manifold valve block and the channel block to facilitate the reaction. Upon completion of the reactant cycle, the manifold valve block is disconnected from the channel block and connected to a cleavage block assembly which contains vials for collecting reaction products. The cleavage product is drained from the reaction vessels through the manifold valve block into the vials upon opening the valves in the manifold valve block and applying a vacuum to the channel block.

24 Claims, 30 Drawing Sheets

U.S. PATENT DOCUMENTS

| | | |
|---|---|---|
| 4,761,381 | 8/1988 | Blatt et al. . |
| 4,777,021 | 10/1988 | Wertz et al. . |
| 4,810,471 * | 3/1989 | Wachob et al. ................... 422/103 |
| 4,909,933 * | 3/1990 | Carter et al. ...................... 210/95 |
| 4,927,604 | 5/1990 | Mathus et al. . |
| 4,963,498 | 10/1990 | Hillman et al. . |
| 4,981,786 | 1/1991 | Dafforn . |
| 5,053,454 * | 10/1991 | Judd ................................ 525/54.11 |
| 5,108,704 | 4/1992 | Bowers et al. . |
| 5,133,939 | 7/1992 | Mahe . |
| 5,137,698 * | 8/1992 | Ansorge et al. ................... 422/242 |
| 5,141,719 | 8/1992 | Fernwood et al. . |
| 5,168,901 * | 12/1992 | Marks ............................... 137/884 |
| 5,203,368 * | 4/1993 | Barstow et al. ................... 137/240 |
| 5,219,528 | 6/1993 | Clark . |
| 5,227,137 | 7/1993 | Monti et al. . |
| 5,252,296 | 10/1993 | Zuckerman et al. . |
| 5,368,823 * | 11/1994 | McGraw et al. ................... 422/134 |
| 5,380,437 * | 1/1995 | Bertoncini ........................ 210/416.1 |
| 5,472,672 | 12/1995 | Brennan . |
| 5,503,805 * | 4/1996 | Sugarman et al. ................. 422/131 |
| 5,529,756 | 6/1996 | Brennan . |
| 5,538,694 * | 7/1996 | Delius ............................... 422/131 |
| 5,609,826 * | 3/1997 | Cargill et al. ...................... 422/99 |
| 5,641,459 * | 6/1997 | Holmberg ......................... 422/134 |
| 5,716,584 * | 2/1998 | Baker et al. ....................... 422/131 |
| 5,866,342 * | 2/1999 | Antonenko et al. ............... 435/7.1 |

* cited by examiner

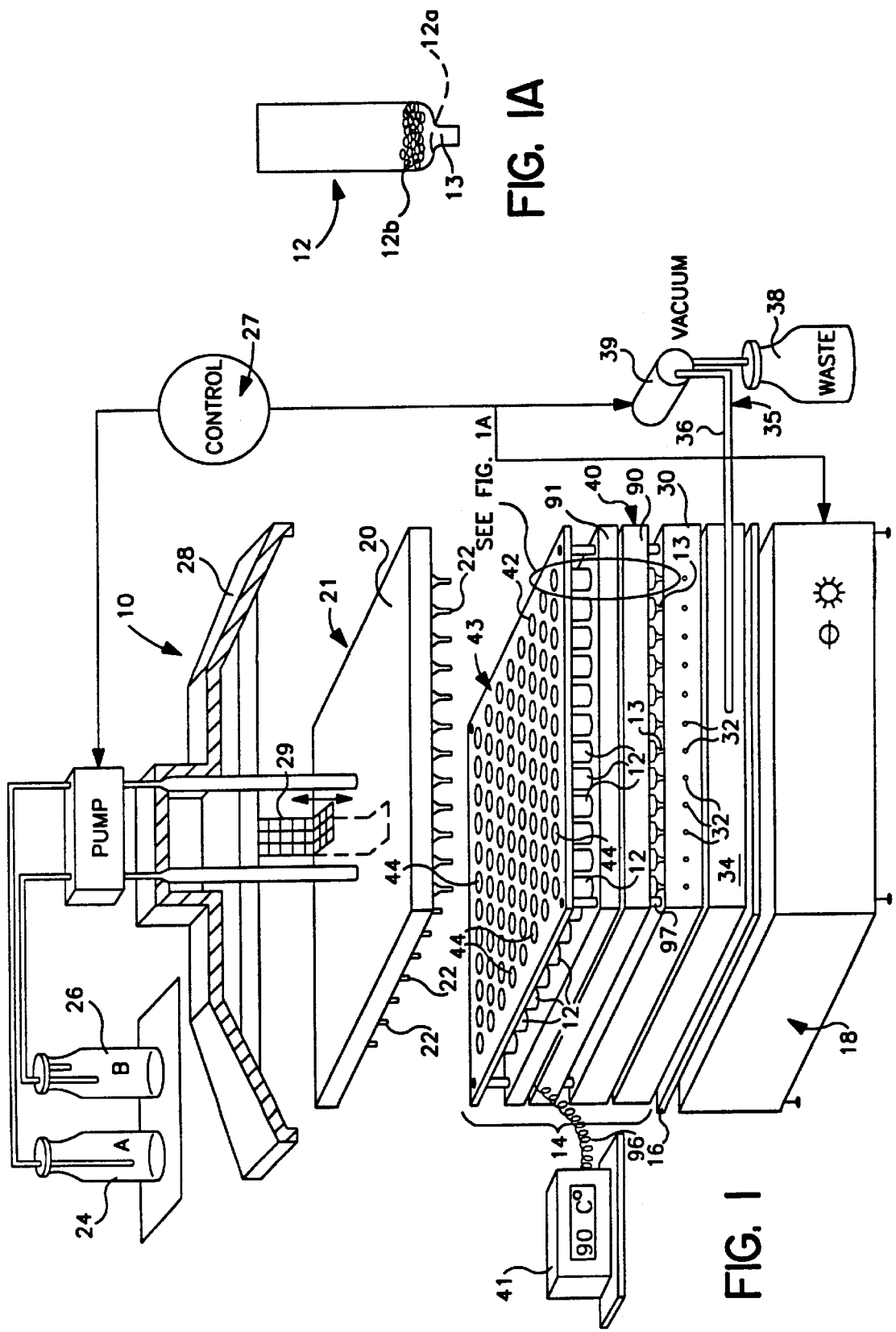

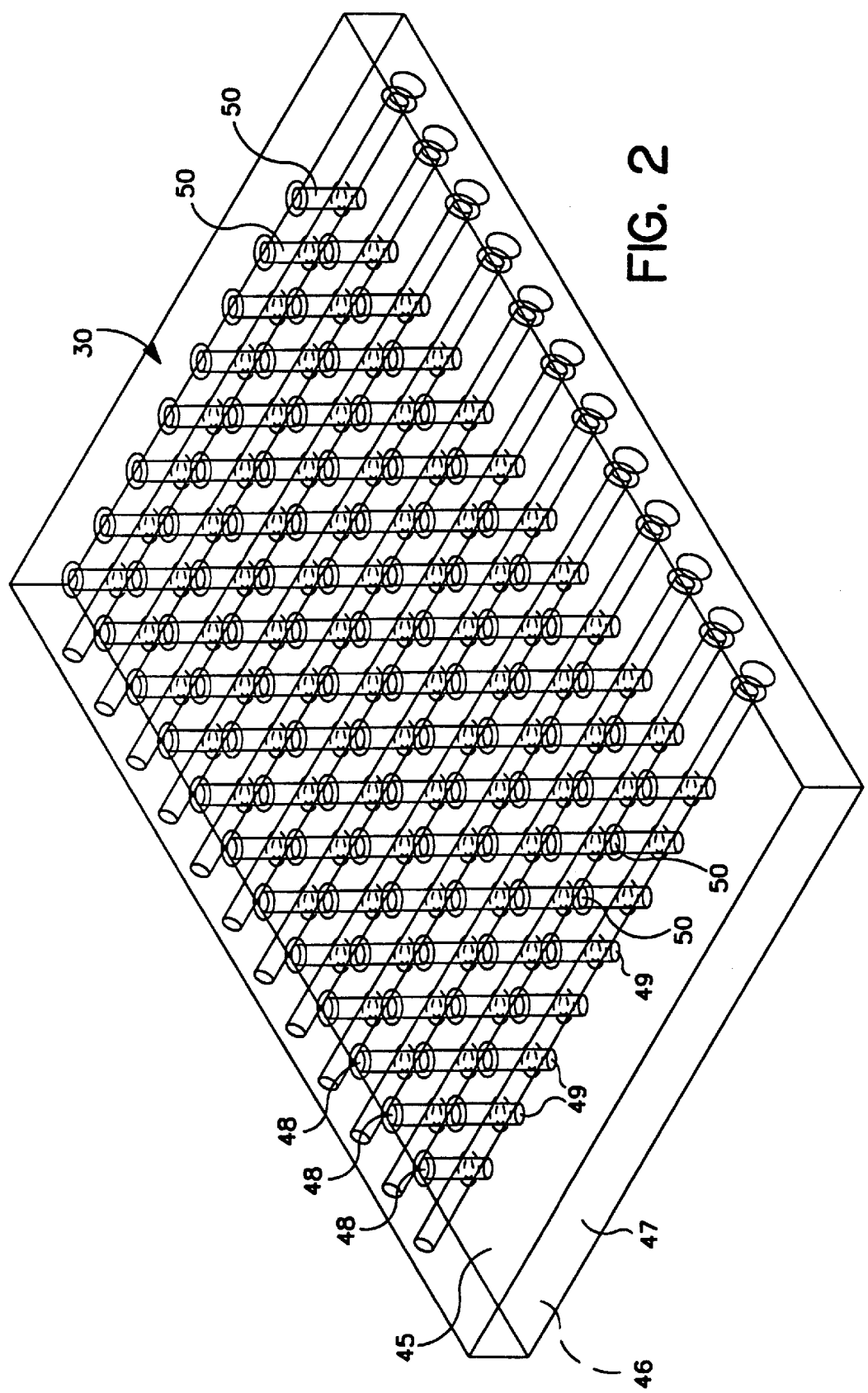

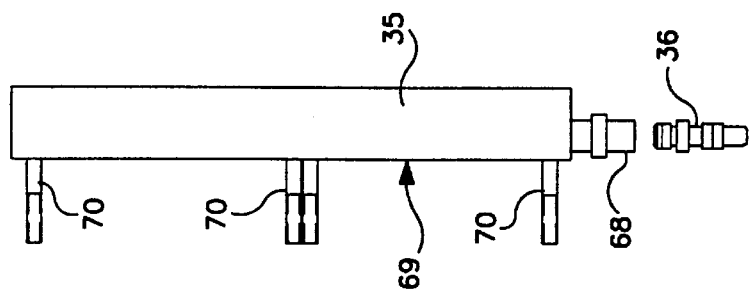
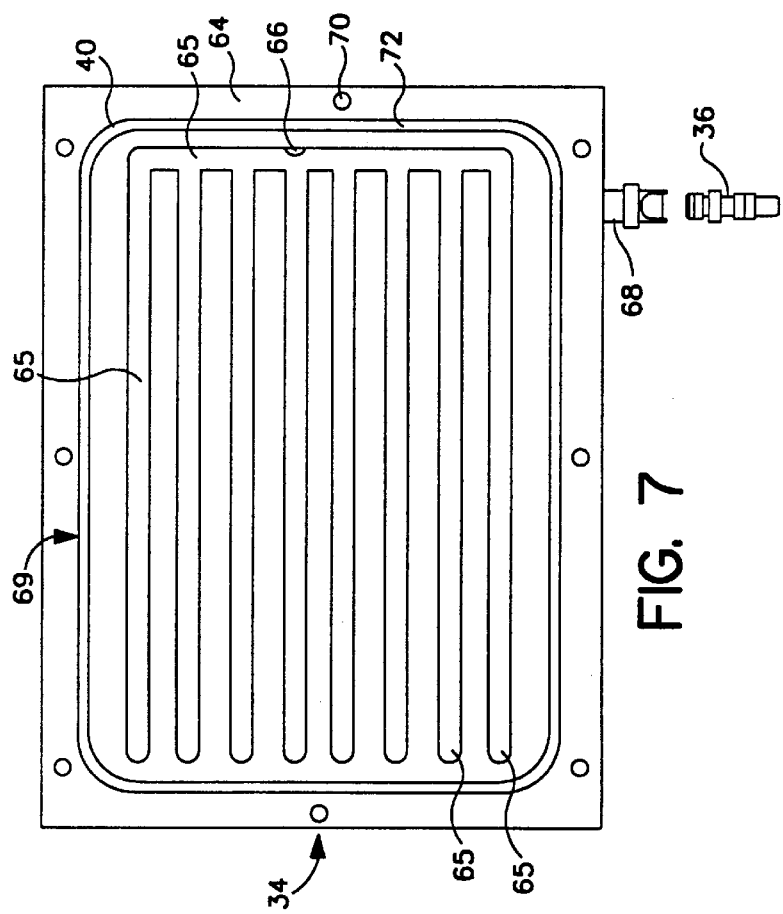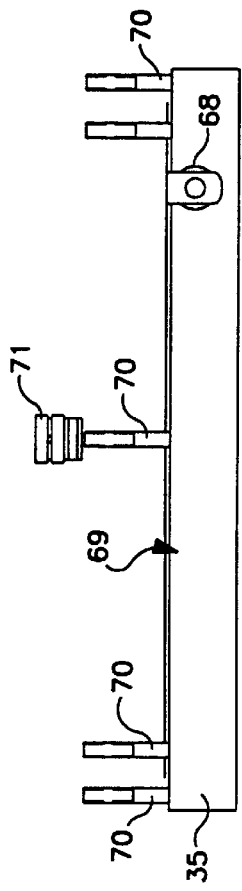

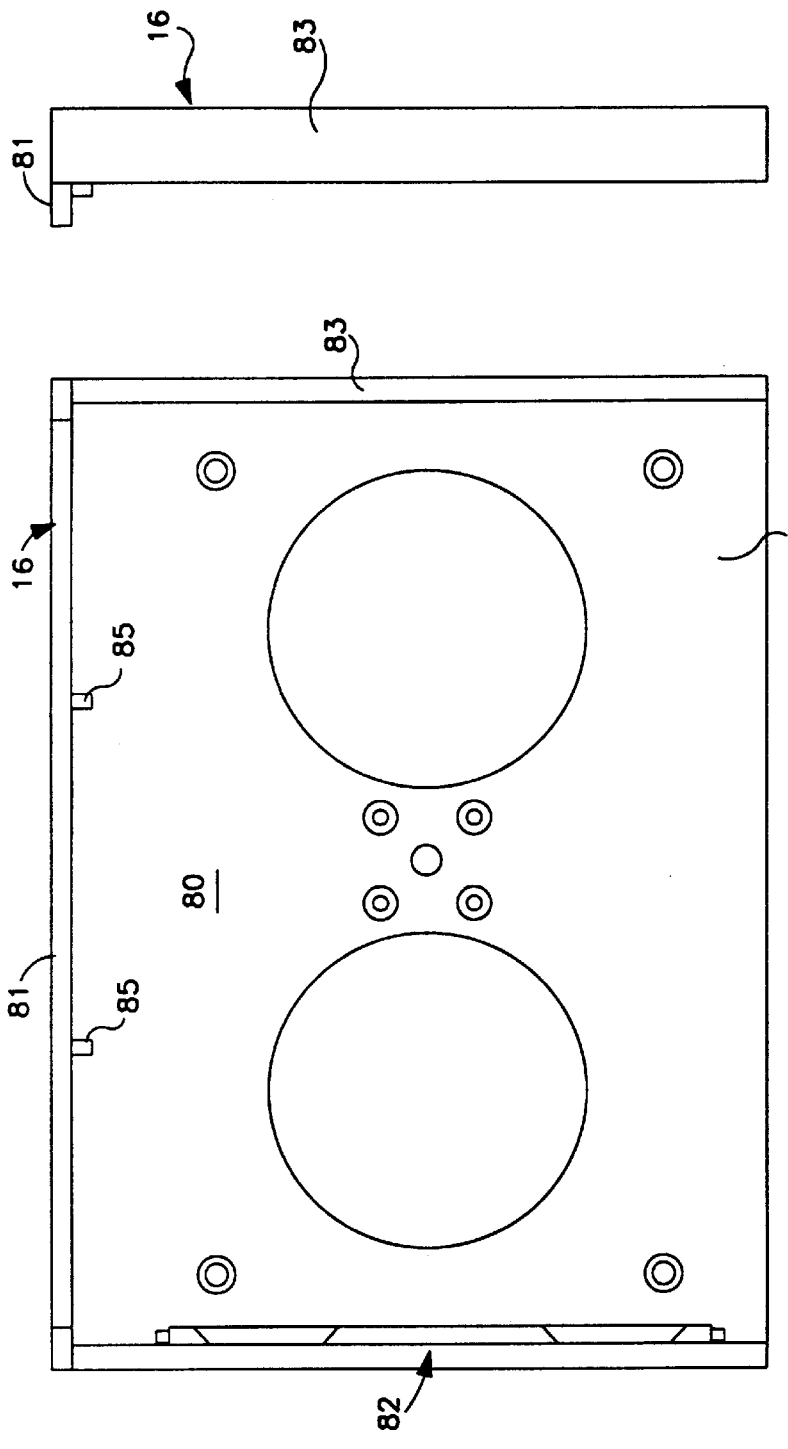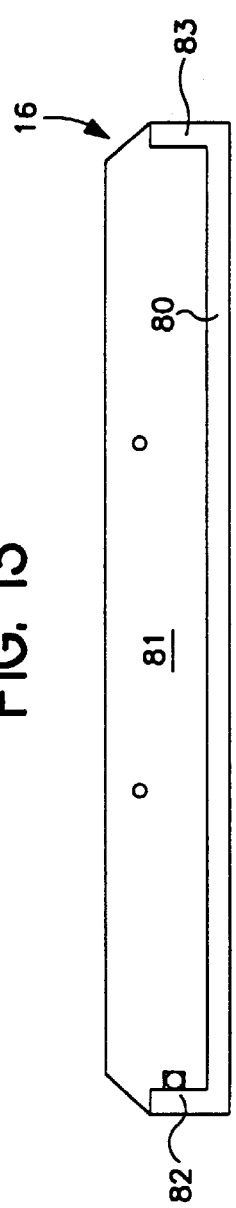

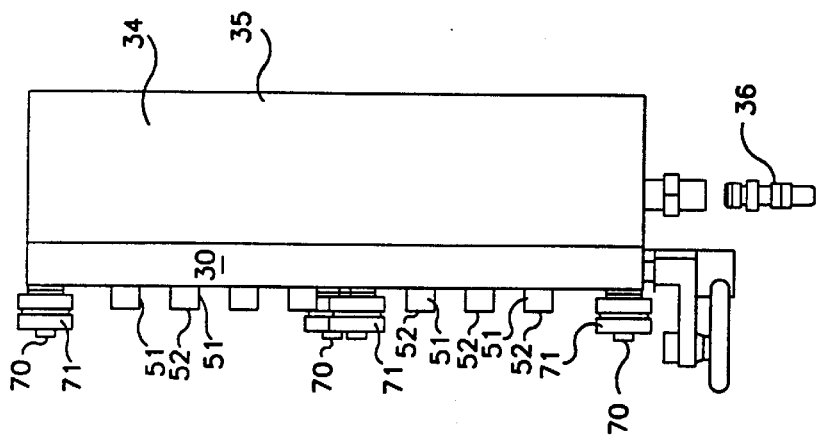
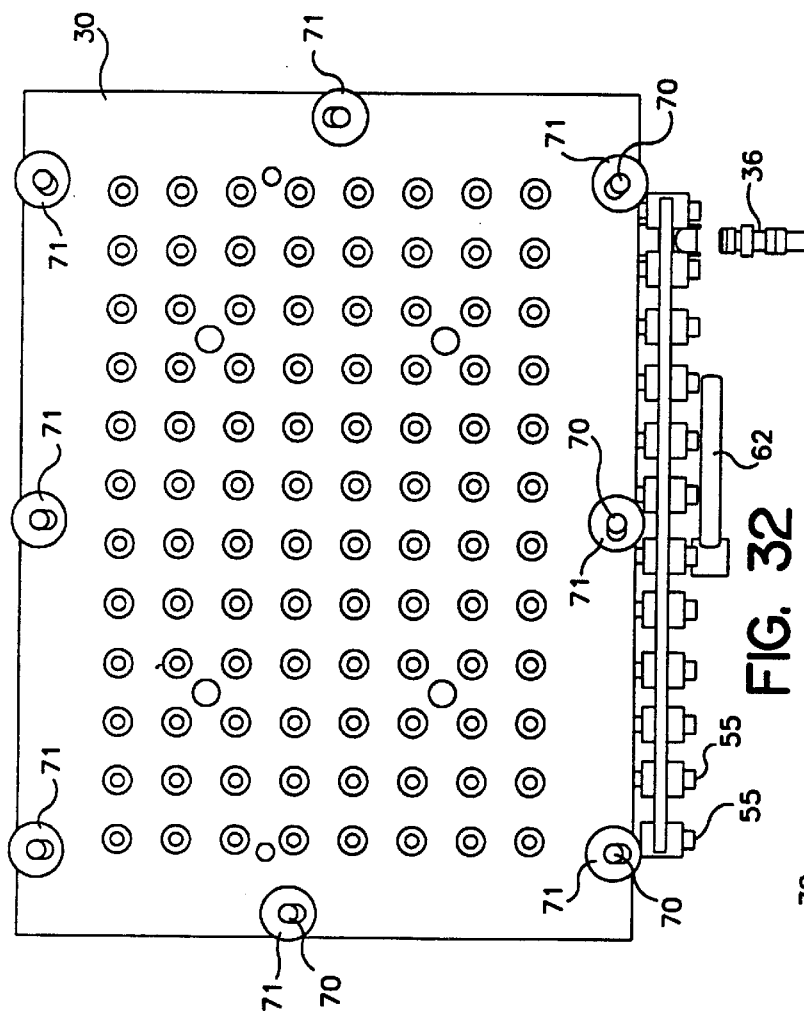
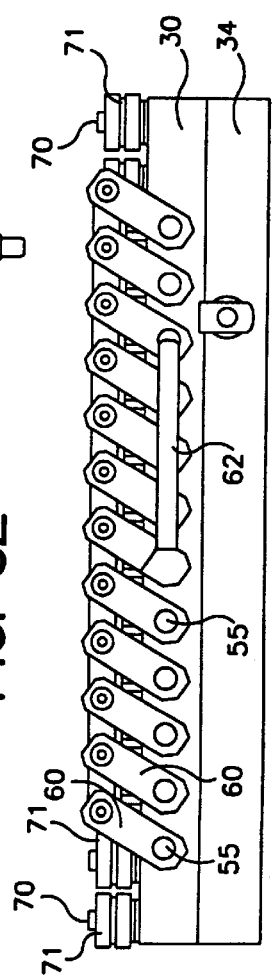

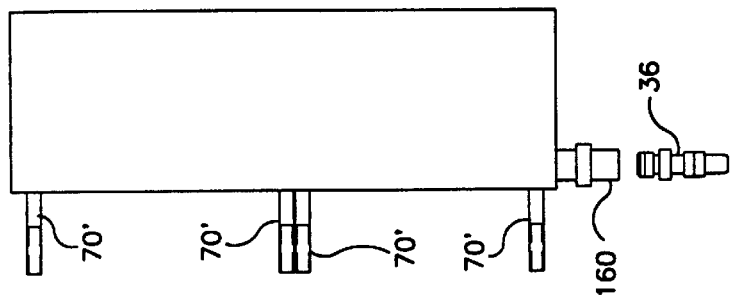
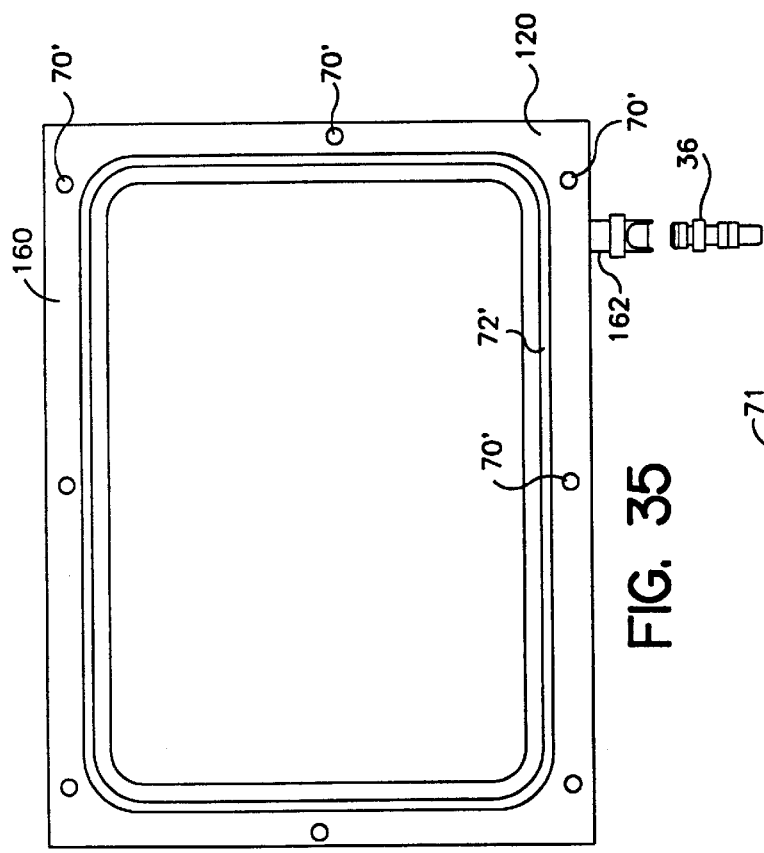
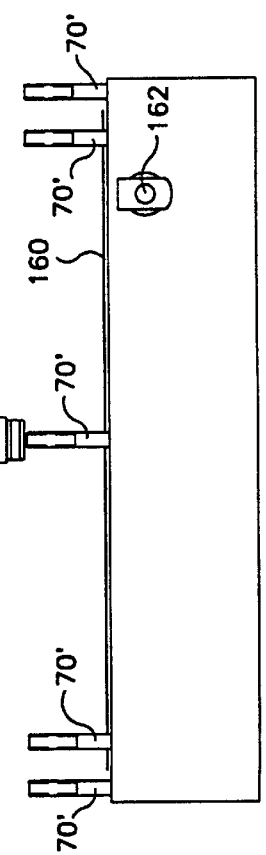

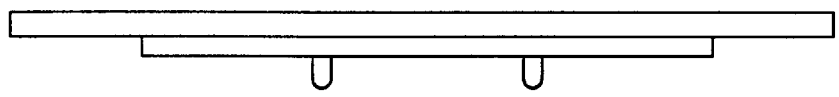
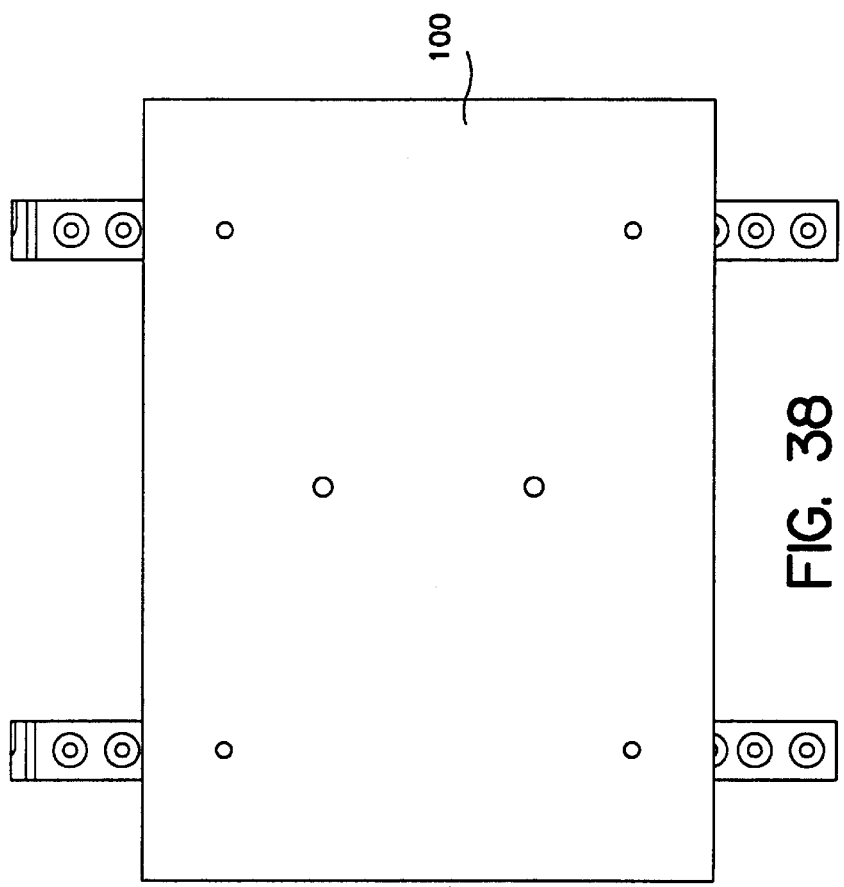
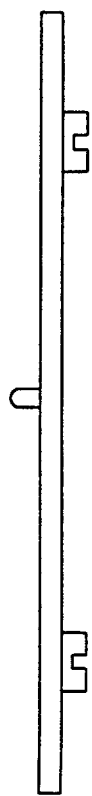
FIG. 40
FIG. 38
FIG. 39

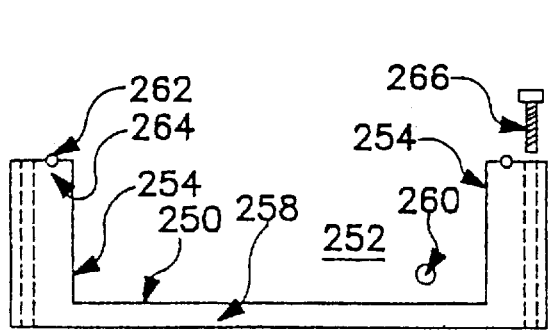
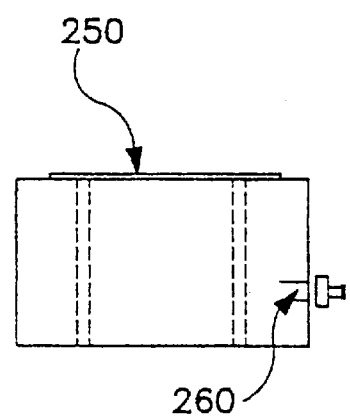
FIG. 51   FIG. 53
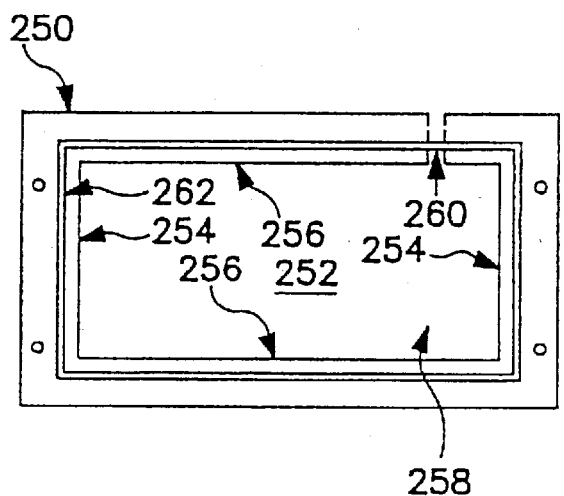
FIG. 52

APPARATUS AND PROCESS FOR MULTIPLE CHEMICAL REACTIONS

CROSS-REFERENCE TO RELATED APPLICATIONS

This is a continuation of application Ser. No. 08/717,797 filed Sep. 23, 1996, now U.S. Pat. No. 5,888,830; which is a CIP of Ser. No. 08/532,279, filed Sep. 22, 1995 now amended.

FIELD OF THE INVENTION

The invention relates to an apparatus and process for performing multiple chemical reactions, in particular for performing multiple solid phase chemical synthesis reactions and for isolating and collecting the final products of chemical reactions.

BACKGROUND OF THE INVENTION

One of the key processes in solid phase chemical synthesis is the washing of the solid support resin which has a chemical template attached thereto. Multiple washing cycles with different solvents ensures that all excess reagents used during reaction cycles are washed from the resin. A typical protocol involves addition of a wash solvent, shaking the resin with the solvent for five minutes and then removing the wash solvent from the reaction vessel. In many instances, the wash solvent is drained from the bottom of the reaction vessel by applying a vacuum, i.e., filtering the resin free of the waste solvent. The task is further complicated when multiple solid phase syntheses are simultaneously carried out.

For example, if each reaction vessel is to be subjected to a filtration step, performing separate filtration on each individual reaction vessel can be very time consuming. Alternatively, if filtering is to be performed on all of the reaction vessels simultaneously, this can lead to a very complicated and awkward arrangement of apparatus with, for example, each individual reaction vessel being connected to a vacuum source by a separate vacuum hose.

As described above, the waste liquid is flushed out during the washing cycles typically by vacuum filtration. During reaction cycles, however, the solvent and the reagents are to be retained in the reaction vessel which by design has a filter at the bottom. Previously, when batch filtering from several sources, each source was connected to the filter by a line with each line having a stop-cock or valve to regulate drainage.

SUMMARY OF THE INVENTION

An object of a first embodiment of this invention is to provide a reaction apparatus for performing multiple chemical reactions on solid support in a parallel fashion which provides stable support for multiple reaction vessels and permits such tasks as washing and filtering to be performed simultaneously on all the reaction vessels in a simple and easy manner through a manifold design. A further object is to provide an apparatus to be used in association with the reaction apparatus, for cleaving reaction products from the solid support and separately collecting the reaction products from each of the individual reaction vessels. Still a further object is to provide for the simultaneous release of fluid from reaction vessels.

Upon further study of the specification and appended claims, further objects and advantages of this invention will become apparent to those skilled in the art.

These objects are achieved at least in part in accordance with the invention by a reaction grid apparatus that can be used to perform multiple separate chemical reactions, the reaction grid comprising:

a first retaining member with a plurality of openings therethrough, each opening having an inlet and an outlet connected through a valve;

a separate reaction vessel for mounting in the inlet of each opening;

a drainage member having drainage channels therein aligned with the outlets of the bores; and a valve operator for operating at least several of the valves simultaneously to drain fluids from the reaction vessels into the drainage member.

Also, in accordance with the invention, a cleavage block assembly is provided for separately collecting reaction products from multiple separate reactions, the cleavage block assembly comprising:

a vial rack capable of supporting an array of separate vials; a cleavage block section having a chamber therein for receiving the vial rack and a vacuum port for applying a vacuum to the chamber;

a reaction grid section having an array of openings therethrough, each opening corresponding in position to a position in the vial rack, the reaction grid section including a valve associated with each opening;

an array of reaction vessels mounted in the openings in the reaction grid and having reaction products therein; and members for securing the reaction grid section to the cleavage block section in sealed relation therewith.

In accordance with the invention, the reaction reagents and solvents are contained within each of the reaction vessels.

Further, in accordance with a process aspect, the invention provides a process for performing multiple reactions and separately collecting reaction products, the process comprising:

connecting reaction vessels to valved openings through a manifold block of a reaction grid;

loading each of the reaction vessels with solid support beads and attaching chemical templates to the solid support beads via linkers;

performing chemical synthesis reactions for the preparation of organic molecules within each of the reaction vessels;

removing fluid from the reaction vessels by opening the valved openings to drain the fluid to a channeled block by applying a vacuum to the channeled block;

washing the solid support beads with wash solvent and removing the wash solvent from the reaction vessels by draining the wash solvent to a channel block;

removing the manifold block from connection with the channeled block and connecting the manifold block to a cleavage section, the cleavage section comprising a chamber containing a plurality of vial ports each holding a separate vial, each of the vial ports communicating with an inlet port of the manifold block, the cleavage section further comprising an outlet for connecting the chamber to a vacuum supply;

cleaving desired organic product from each of the reaction vessels and collecting the organic product within the individual vial.

The reaction grid in accordance with the invention enables the user to simultaneously carry out multiple chemical synthesis of desired molecules using solid phase chemical synthesis. Each of the multiple connection elements attached to the inlet ports of the reaction grid provide means for rigid and stable attachment of a reaction vessel such as a syringe barrel.

The reaction grid also allows the user to carry out several different steps in a chemical synthesis process in an integrated manner. Using standard protocols for solid phase synthesis, the reaction grid permits a user to simultaneously rinse or vacuum filter all of the reaction vessels. In addition, the user can perform different reactions simultaneously by utilizing different reagents in each of the reaction vessels during the synthesis mode. Furthermore, the reaction grid provides easy manipulation with respect to agitation. The reaction grid can be conveniently attached to a agitation device such as a wrist action shaker, vortexer or orbital shaker.

The plurality of inlet ports in the top surface of the reaction grid can be arranged in any suitable design. Preferably, the inlet ports are arranged in the form of a square or rectangular array having a certain number of rows and columns. A square or rectangular array is preferred for ease of formatting and tabulating individual chemical products obtained from a matrix synthesis.

The reaction grid can be designed to provide any desired number of inlet ports for attachment of reaction vessels. In a preferable arrangement, the reaction grid has 96 inlet ports in a 12×8 array, this being the standard microtiter plate format used in industry for high throughput screening of compounds and biological assays. It is emphasized that other arrays, such as the smaller 5×8 array of parent application Ser. No. 08/532,279, filed Sep. 22, 1995, incorporated herein by reference, may be used in the practice of this invention.

Of course, even larger arrays, for example, a 100×100 matrix, can be provided in accordance with the invention. However, such large arrays require a large reaction grid which may require specialized agitation equipment and accessories for addition of solvents and reagents.

Each of the inlet ports is preferably equipped with a connection element that provides rigid and stable attachment of a reaction vessel to the inlet port.

In accordance with the preferred embodiment, the reaction vessels are syringe barrels with a male Luer connection tip and a filter positioned at the end of the barrel. The connection element is preferably a female Luer-type connection element unitary with a valve insert in an opening through a first block of the reaction grid. Thus, when a reaction vessel is inserted into an inlet port, the male Luer connection tip of the syringe engages the female Luer-type connector of the valve insert to provide a stable, rigid connection. Preferably, the Luer connections are unitary with the valve inserts in the manifold plate with the syringes of the reaction vessels being separate therefrom.

Preferably, valves are disposed between each of the male and female connectors, with at least several of the valves being interconnected to operate simultaneously.

In accordance with a preferred embodiment, the reaction grid has an overall square or rectangular shape, and comprises two rectangular sections; a top section and a bottom section. The inlet ports pass through the entire thickness of the top section from its top surface, which is also the top surface of the grid, to its bottom surface. The bottom section, on the other hand, is provided with the substantially horizontal channels. By substantially horizontal, it is meant that the channels are oriented to provide drainage evenly from all of the reaction vessels without causing cross-contamination.

Between the two square or rectangular sections a gasket is positioned to provide a vacuum seal between the top and bottom sections. Preferably, a groove for the gasket is machined into either the bottom surface of the top section, or the top surface of the bottom section. The gasket is then positioned within this groove. The top and bottom sections can be connected to each other by any suitable fastening means, for example, bolts or clamps.

After completion of the multiple reactions, a further development of the invention, the cleavage block assembly, can be used to separately collect the products from the individual reaction vessels. The cleavage block assembly comprises the top section or manifold section of the reaction grid, a vial rack capable of supporting multiple vials, and a cleavage block section having a chamber for holding the vial rack.

The vial rack supports an array of collection vials, which array corresponds to the array of inlet ports and reaction vessels of the top section of the reaction grid. The vials are held in a vertical orientation whereby fluid from each reaction vessel can flow through an inlet port into the mouth opening at the top of a vial.

In the cleavage block section, an internal chamber is provided which is adapted to hold the vial rack. Once the vial rack containing an array of vials is positioned within the internal chamber, the top section of the reaction grid is then positioned on top of the cleavage section and attached thereto by suitable fastening means, e.g., bolts or clamps. To facilitate drainage of the reaction vessels and collection of reaction products within the individual vials, the cleavage section is provided with a vacuum port that communicates with the internal chamber. The vacuum port can be connected to a vacuum source to thereby apply a vacuum to the internal chamber. As a result, fluid is withdrawn from each of the reaction vessels and collected in the vials.

In accordance with a further aspect of the first embodiment of the invention, the aforementioned objects, advantages, methods, systems and apparatus are further enhanced by performing fluid dispensing operations for washing and cleaving by employing a fluid dispensing system for simultaneously dispensing process fluids.

In accordance with still a further aspect of the first embodiment of the invention, the aforementioned objects, advantages, methods, system and apparatus are further enhanced by heating or cooling the reactions.

The objects of the invention are achieved in accordance with the second embodiment of the invention by a reaction grid apparatus that can be used to perform multiple separate chemical reactions, the reaction grid comprising:

a block substrate having a top surface and at least one side wall;

a plurality of inlet ports in the top surface;

one or more substantially horizontal channels within the substrate, wherein each of the inlet ports is in fluid communication with at least one of the channels;

an outlet port in fluid communication with the one or more channels; and a plurality of connection elements, each connection element being connected to an inlet port in the top surface of the substrate, and each of the connecting elements having means for attachment of an individual reaction vessel.

Also, in accordance with the invention, a cleavage block assembly is provided for separately collecting reaction prod ucts from multiple separate reactions, the assembly comprising:
   a vial rack capable of supporting an array of separate vials;
   a cleavage section having a chamber therein for receiving the vial rack and a vacuum port for applying a vacuum to the chamber;
   a reaction grid section having an array of openings therethrough, each opening corresponding in position to a position in the vial rack, the reaction grid section including a Luer connector in each opening; and
   members for securing the reaction grid section to the cleavage section in sealed relation therewith.

In accordance with the second embodiment of the invention, the reaction reagents and solvents are contained within each of the reaction vessels. Individual valves and/or stop-cocks attached to each vessel are not needed since the pressure above the reaction medium is insufficient to induce drainage. In this regard, the reaction block with the reaction vessels provides a clear advantage in that manual or automated valves are not required to contain the reagents within the vessel.

Further, in accordance with a process aspect of the second embodiment, the invention provides a process for performing multiple reactions and separately collecting reaction products, the process comprising:
   connecting a reaction vessel to each of the connection elements of the reaction grid, the reaction vessel comprising a syringe having a syringe barrel and a male Luer connection tip, each of the syringes being fitted with a filter at the bottom of the barrel;
   loading each of the reaction vessels with solid support beads and attaching chemical templates to the solid support beads via linkers;
   performing chemical synthesis reactions for the preparation of organic molecules within each of the reaction vessels;
   removing fluid from the reaction vessels by connecting the outlet port to a vacuum supply;
   washing the support solid support beads with wash solvent and removing the wash solvent through the outlet port;
   removing a top first rectangular section of the reaction grid from connection with a bottom second rectangular section of the reaction grid and connecting the top section to a cleavage section, the cleavage section comprising a chamber containing a plurality of receptacle ports each holding a separate receptacle, each of the receptacle ports communicating with an inlet port of the top rectangular section, the cleavage section further comprising an outlet for connecting the chamber to a vacuum supply means;
   cleaving desired organic product from each of the reaction vessels and collecting the organic product within the individual receptacles.

The reaction grid in accordance with the second embodiment of the invention enables the user to simultaneously carry out multiple chemical synthesis of desired molecules using solid phase chemical synthesis. Each of the multiple connection elements attached to the inlet ports of the reaction grid provide means for rigid and stable attachment of a reaction vessel such as a syringe barrel.

The reaction grid also allows the user to carry out several different steps in a chemical synthesis process in an integrated manner. Using standard protocols for solid phase synthesis, the reaction grid permits a user to simultaneously rinse or vacuum filter all of the reaction vessels. In addition, the user can perform different reactions simultaneously by utilizing different reagents in each of the reaction vessels during the synthesis mode. Furthermore, the reaction grid provides easy manipulation with respect to agitation. The reaction grid can be conveniently attached to a agitation device such as a wrist action shaker, vortexer or orbital shaker.

The plurality of inlet ports in the top surface of the reaction grid can be arranged in any suitable design. Preferably, the inlet ports are arranged in the form of a square or rectangular array having a certain number of rows and columns. A square or rectangular array is preferred for ease of formatting and tabulating individual chemical products obtained from a matrix synthesis.

As with the first embodiment, the reaction grid can be designed to provide any desired number of inlet ports for attachment of reaction vessels. For example, the inlet ports can be arranged in the form of a 8×5 rectangular array containing eight columns with five inlet ports in each, and five rows with eight inlet ports in each. In some applications, a user may desire a smaller array, such as, e.g., a 4×4 matrix of 16 inlet ports. The reaction grid also can be designed to have 96 inlet ports in a 12×8 array, this being the standard microtiter plate format used in industry for high throughput screening of compounds and biological assays.

Of course, even larger arrays, for example, a 100×100 matrix, can be provided in accordance with the invention. However, such large arrays require a large reaction grid which may require specialized agitation equipment and accessories for addition of solvents and reagents.

Each of the inlet ports is preferably equipped with a connection element that provides rigid and stable attachment of a reaction vessel to the inlet port. Suitable reaction vessels include syringe barrels attached to a male Luer connector tip.

For example, the inlet ports can be provided with internal threads. A connection element with matching external threads can then be fastened to the reaction grid. In other words, a connection element is threaded into each of the inlet ports whereby the external threads of the connection element engage the internal threads of the inlet port.

In accordance with the second embodiment, the reaction vessels are syringe barrels with a male Luer connection tip and a filter positioned at the end of the barrel. The connection element is preferably a female Luer connection element threaded into the inlet port. Thus, when a reaction vessel is inserted into an inlet port, the male Luer connection tip of the syringe engages the female Luer connector to provide a stable, rigid connection.

In accordance with the second embodiment, as preferred, the reaction grid has an overall square or rectangular shape, and comprises two rectangular sections; a top section and a bottom section. The inlet ports pass through the entire thickness of the top section from its top surface, which is also the top surface of the grid, to its bottom surface. The bottom section, on the other hand, is provided with the substantially horizontal channels. By substantially horizontal, it is meant that the channels are oriented to provide drainage evenly from all of the reaction vessels without causing cross-contamination. Between the two square or rectangular sections an O-ring gasket is positioned to provide a vacuum seal between the top and bottom sections. Preferably, a groove for the O-ring is machined into either the bottom surface of the top section, or the top surface of the bottom section. The O-ring is then positioned within this groove. The top and bottom sections can be connected to each other by any suitable fastening means, for example, bolts or clamps.

The top surface of the bottom section preferably does not expose the channels. Instead, the bottom section is preferably provided with inlet port extensions. Each inlet port extension communicates with an inlet port in the top section. The inlet port extensions also communicate with the internal channels within the bottom section. By providing such inlet port extensions, rather than having the channels of the bottom section exposed on its top surface, the volume of liquid within the channels is minimized, as well as the possibility of cross-contamination. The channels are connected through a manifold system.

As described above, the top part of the inlet ports are preferably threaded to receive, for example, a female Luer connection component provided with external threads. In addition, the ends of the inlet ports at bottom of the top section are also preferably provided with internal threads so as to permit the attachment of a male Luer connection component provided with external threads. These male Luer connection components cooperate in draining fluid from the reaction vessels through the inlet ports and into the channels.

In accordance with a further modification of the previously mentioned second embodiment, the bottom section can be equipped with inlet port extensions that are also provided with internal threads to receive an externally threaded female Luer connection component. Thus, in this embodiment, when the top and bottom sections are brought together, male Luer connector components in the bottom of the top section will fit into a female Luer connection component in the bottom section, thereby providing a further seal between the two sections of the grid.

After completion of the multiple reactions, a further development of the second embodiment of the invention, the cleavage block assembly, can be used to separately collect the products from the individual reaction vessels. The cleavage block assembly comprises the top section of the reaction grid, a vial rack capable of supporting multiple vials, and a cleavage section having a chamber for holding the vial rack.

The vial rack supports an array of collection vials, which array corresponds to the array of inlet ports and reaction vessels of the top section of the reaction grid. The vials are held in a vertical orientation whereby fluid from each reaction vessel can flow through an inlet port into the mouth opening at the top of a vial.

As with the first embodiment, in the cleavage section of the second embodiment, an internal chamber is provided which is adapted to hold the vial rack. Once the vial rack containing an array of vials is positioned within the internal chamber, the top section of the reaction grid is then positioned on top of the cleavage section and attached thereto by suitable fastening means, e.g., bolts or clamps. To facilitate drainage of the reaction vessels and collection of reaction products within the individual vials, the cleavage section is provided with a vacuum port that communicates with the internal chamber. The vacuum port can be connected to a vacuum source to thereby apply a vacuum to the internal chamber. As a result, fluid is withdrawn from each of the reaction vessels and collected in the vials.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a side perspective view of an apparatus configured according to the first embodiment of the present invention for supporting ninety-six reaction vessels, one of which is shown in enlarged isolation, in order to practice the process of the present invention;

FIG. 1A is a side view of a reaction vessel;

FIG. 2 is a perspective view of a valved manifold plate or block used with the apparatus of FIG. 1;

FIG. 7 is a top view of a channel block used in conjunction with the valve manifold assembly of FIGS. 2–6 in the manner shown in FIG. 1 and in FIGS. 32–34;

FIG. 8 is a side view of the channel block of FIG. 7;

FIG. 9 is an end view of the channel block of FIGS. 7 and 8;

FIG. 13 is a top view of a vortexer mounting plate upon which the manifold assembly of FIGS. 2–6, channel block assembly of FIGS. 7–9 and cap system of FIGS. 10–11, when assembled with one another, are mounted for agitation or stirring;

FIG. 14 is a side view of the vortexer mounting plate of FIG. 13;

FIG. 15 is an end view of the vortexer mounting plate of FIGS. 13 and 14;

FIG. 32 is a top view of a reaction grid assembly which comprises the valve manifold assembly of FIGS. 4–6 and the channel block assembly of FIGS. 7–9 retained together with fasteners;

FIG. 33 is a side view of the reaction grid assembly of FIG. 32;

FIG. 34 is an end view of the reaction grid assembly of FIGS. 32 and 33;

FIG. 35 is a top view of a cleavage block used with the assembly of FIGS. 29–31;

FIG. 36 is a side view of the cleavage block of FIG. 35;

FIG. 37 is an end view of the cleavage block of FIGS. 35 and 36;

FIG. 38 is a top view of a robot deck mounting plate used to mount the reaction grid assembly while loading the vials of the reaction grid;

FIG. 39 is a front view of the robot deck mounting plate of FIG. 38;

FIG. 40 is an end view of the robot deck mounting plate of FIGS. 38 and 39;

FIG. 51 is a side elevational view of a cleavage block configured to receive the vial rack of FIGS. 49 and 50;

FIG. 52 is a top view of the cleavage block of FIG. 51;

FIG. 53 is an end view of the cleavage block of FIGS. 51 and 52; and

DETAILED DESCRIPTION OF THE DRAWINGS

Figure 3A:
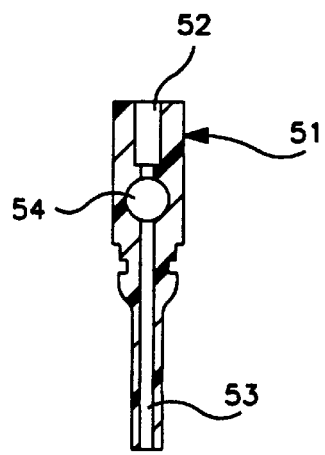
FIG. 3A is a side elevation of one of ninety-six valve inserts mounted in the manifold plate or block of FIG. 2.
Figure 3B:
FIGS. 3B and 3C are side views of a valve stem used with an aligned array of valve inserts in the valved manifold plate of FIG. 2.
Figure 3C:
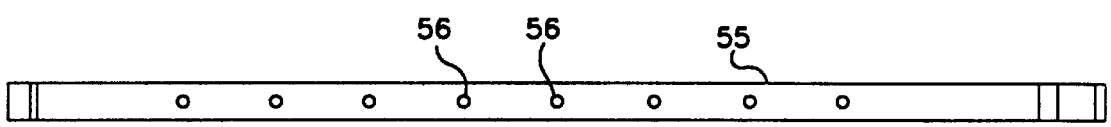

First Embodiment of the Invention—FIGS. 1–46
Reaction Grid Structure

Referring now to FIG. 1, there is shown a reaction station system 10, in accordance with the present invention, having an 8×12 array or matrix of reaction stations arranged in twelve columns and eight rows with each reaction station associated with a single reaction vessel 12 having a syringe tip 13. Each of the reaction vessels 12 is of a generally known configuration and includes a filter 12a at a syringe tip 13 above which is a fritt 12b is configured as solid support beads upon which chemical templates are attached via appropriate linkers. The filter 12a normally holds liquids such as solvents and reaction products in the reaction vessel 12. As will be explained hereinafter, application of a partial vacuum to the syringe tip 13 evacuates these liquids from the plurality of reaction vessels 12 simultaneously.

Generally, the reaction station system 10 is comprised of a reaction grid assembly 14 which is fixed to a universal mounting plate 16 that is in turn attached to a vortexer 18. The vortexer 18 stirs the contents of the reactor vessels 12 by imparting a circular motion to the reaction grid 14.

Above the reaction grid 14 is a fluid delivery manifold 20 forming part of a liquid delivery system 21 which has an array of ninety-six injection probes in the form of needles 22 each of which is aligned with a separate reaction station for dispensing washing solvent from reservoirs 24 and 26 to the reaction vessels 12. Operation of the liquid delivery system 21 is controlled by a PLC controller 27. The reaction grid 14 and fluid delivery manifold 20 are covered by an exhaust hood 28.

The fluid delivery manifold 20 is preferably mounted on a wall or other support by an elevator system 29 which lowers and raises the fluid delivery manifold to deliver fluid to the reaction vessels via the needles 22. While the vortexer 18 is agitating the contents within the reaction vessels 12, the needles 22 are withdrawn from the reaction vessels 12 and spaced from the reaction grid 14.

The reaction grid 14 includes a manifold valve block 30 in the form of a first rectangular section with the rows of valve operators 32 therein aligned with separate rows of valves for each reaction vessel so that the reaction vessels can be closed to retain solvents therein during the reaction stage of the process. The manifold valve block 30 also has a plurality of inlet ports 23 in the top surface thereof, each of which receives the syringe tip 13 of a reaction vessel 12. Beneath manifold block 30 is a channel block 34 in the form of a second rectangular section which has channels therein for draining fluid out of the system via a drainage system 35 and combines with the manifold valve block to comprise the reaction grid 14. The channel block 34 which forms the second rectangular section has a top surface with a plurality of inlet portion extensions. The drainage system 35 includes an exhaust line 36 connected to a waste vessel 38 and a vacuum pump which draws fluid from the reaction vessels 12 after the valves in the manifold valve block 30, operated by the valve operators 32, have been opened. The controller 27 which operates the washing system 21, may also be used to operate the drainage system 35.

A thermal control block 40 with ninety-six apertures therethrough surrounds each one of the reaction vessels 12 to control the temperature of the reaction by either heating the contents of the reaction vessels or cooling the contents of the reaction vessels during the reaction.

A capping plate 42 overlies the open tops of the reaction vessels 12 and seals each reaction vessel. The capping plate 42 is part of a capping assembly 43 and includes ninety-six holes 44 therethrough, each of which holes is sealed by a silicon rubber septum sheet which is disposed between the capping plate 42 and the open tops of the reaction vessels 12. The needles 22 each simultaneously puncture the sealing material aligned with the holes 44 to deliver solvent to the reaction vessels. After the solvent has been delivered to the reaction vessels 12, the fluid delivery manifold 20 is raised and the vortexer 18 agitates the ninety-six solutions in the ninety-six reaction vessels 12 for a selected period of time. Upon conclusion of the agitation, the valves operated by the valve operators 32 are opened and the washing fluid is drawn off through line 36. Fluid treatment may be repeated a number of times with the same or different fluids, depending on the reaction sought in the reaction vessels 12 whether the reaction is anticipated or unanticipated. The reaction block 14 is disposed between the fluid dispensing system 21 and the drainage system 35 which are configured to facilitate rapid and convenient fluid treatment and processing of the contents in the reaction vessels 12. The reaction station concept having been thus far described broadly, the following description sets forth in greater detail the structure and function of the various components shown in FIG. 1.

Referring now to FIGS. 2 and 3A–C, where the manifold valve block 30 and associated insert valves are shown, it is seen that the manifold plate is in the form of a first polypropylene block having an upper surface 45, a lower surface 46 and side surfaces 47 with inlets 48 through the upper surface 45 and outlets 49 through the bottom surface 46. The inlets and outlets 48 and 49 are each connected by first passages 50, each of which first passages 50 receives a valve insert 51 (FIG. 3A). Each valve insert 51 has a female Luer connector 52 at the top and a male Luer connector 53 at the bottom. Each female Luer connector 52 serves as an inlet into the manifold valve block 30 and receives the syringe tip 13 of one reaction vessel 12. Each male Luer connector 53 serves as an outlet for fluid passage from the manifold valve block 30. Each valve insert 51 further includes a lateral bore 54 therethrough which receives a valve stem 55 (see FIGS. 3B and 3C). The valve stem 55 is a rod having transverse holes 56 therethrough which are aligned with the axes of the female and male Luer connectors to allow for liquid to drain through the valve inserts 51 and are misaligned with the Luer connectors by rotation of the valve stems 55 to block the flow of liquid through the valve inserts. By rotating the valve stems 55, eight of the valve inserts 51 can be opened and closed simultaneously. The valve stems are received in second passages 57 through the block which intersect the first passages 50 and allow access to a plurality of first passages by a valve stem 55.

Figure 6:
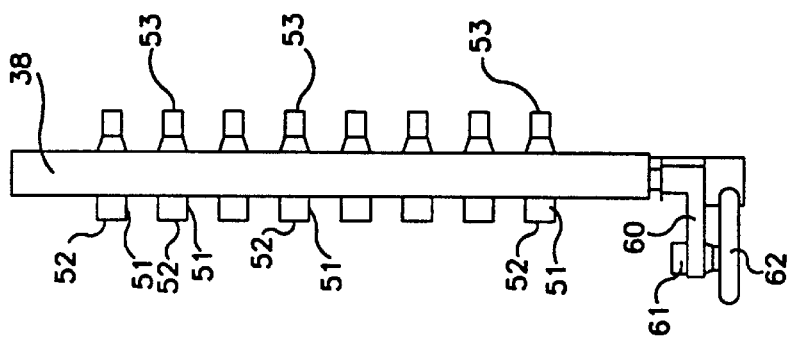
FIG. 6 is an end view of the valve manifold assembly of FIGS. 4 and 5.
Figure 4:
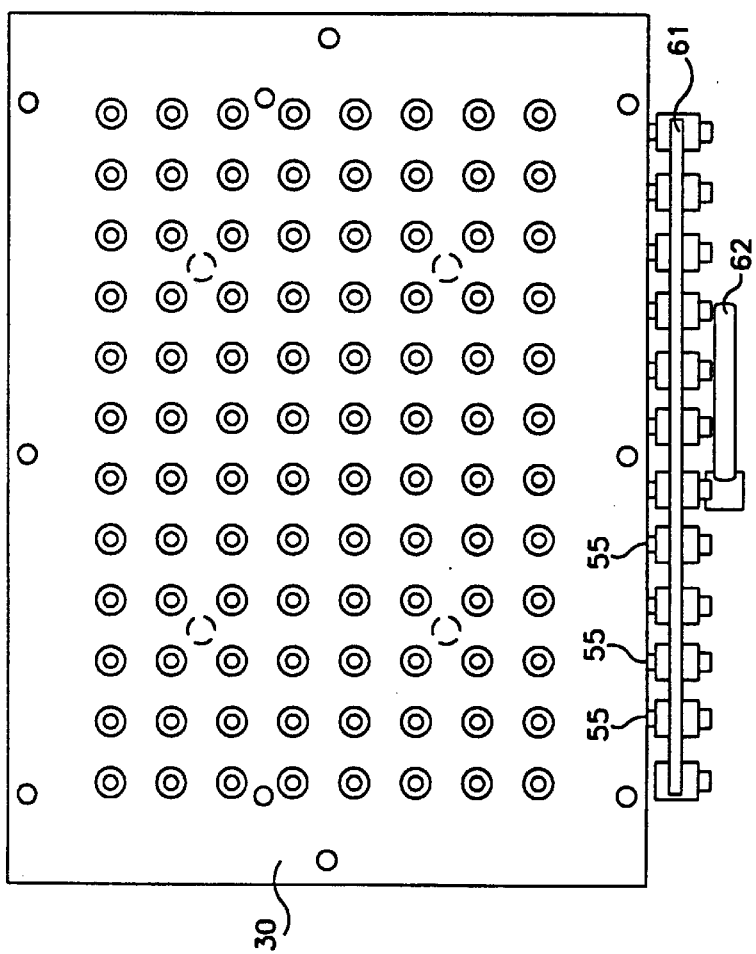
FIG. 4 is a top view of a valve manifold assembly with a multi-valve operator.
Figure 5:
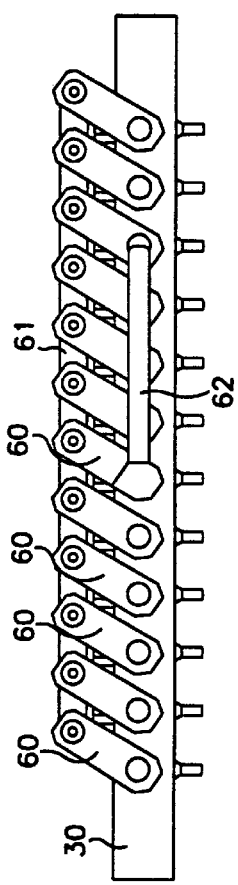
FIG. 5 is a side view of the valve manifold assembly of FIG. 4.

Referring now to FIGS. 4–6, there is shown an arrangement for operating all twelve of the valve stems 55 simultaneously so as to simultaneously block drainage from or allow drainage from the ninety-six reaction vessels 12 simultaneously. This is accomplished by fixing a link 60 non-rotatably to each valve rod 55 and connecting the links 60 to an actuator link 61. When one of the links 60 is opened or closed by rotating a handle 62, then the actuator link 61 causes every link 60 to rotate, closing or opening each of the ninety-six valve inserts 51 simultaneously.

Referring now to FIGS. 7–9, a second polypropylene block in the form of the channel block 34 is shown. The channel block 34 is a drainage block which is assembled together with the manifold valve block 30 to form the reaction grid assembly 14 for collecting waste fluid drained from the reaction vessels 12. The channel block 34 has a cavity therein defined by a series of interconnected channels 65 aligned with the male Luer connectors 53 of the valve inserts 51 in the manifold valve block 30 so that when the valve inserts are opened, the liquid therein simultaneously drains into the array of interconnected channels. There is a drain hole 66 in the array of interconnected channels which is connected by fluid passages in the channel block 34 to a quick connect drain fitting 68 that is in turn connected by the line 36 (see FIG. 1) to a waste collector 68. Liquids, such as solvents in the reaction vessels 12 are pulled through the filters 12a in the reaction vessels 12 (see FIG. 1) by a vacuum pump 39 (see FIG. 1).

The channel block 34 has a face 69 with a surface groove therein which surrounds the area containing the open interconnected channels 65. The groove retains a gasket 72 therein. The gasket 72 seals with the bottom surface 46 of the manifold valve block 30 so that when liquid is drained from the reaction vessels 12 through the valve inserts 51, it does not leak outside of the system 10. The channel block includes eight posts 70 which extend therefrom and pass through holes in the manifold valve block 30 to properly position the manifold valve plate with respect to the channel block. The assembly of the manifold valve block 30, or first block, and the channel block 34, or second block, is held tightly engaged by quick tighteners 71 which are received over and tightened about the posts 70. The face 69 is a coupling face allowing rapid assembly with the bottom surface 46 of the manifold valve block 30 which, in essence, provides a coupling face for the vessel retaining member (the manifold block 30) that mounts the reaction vessels 12.

Figure 10:
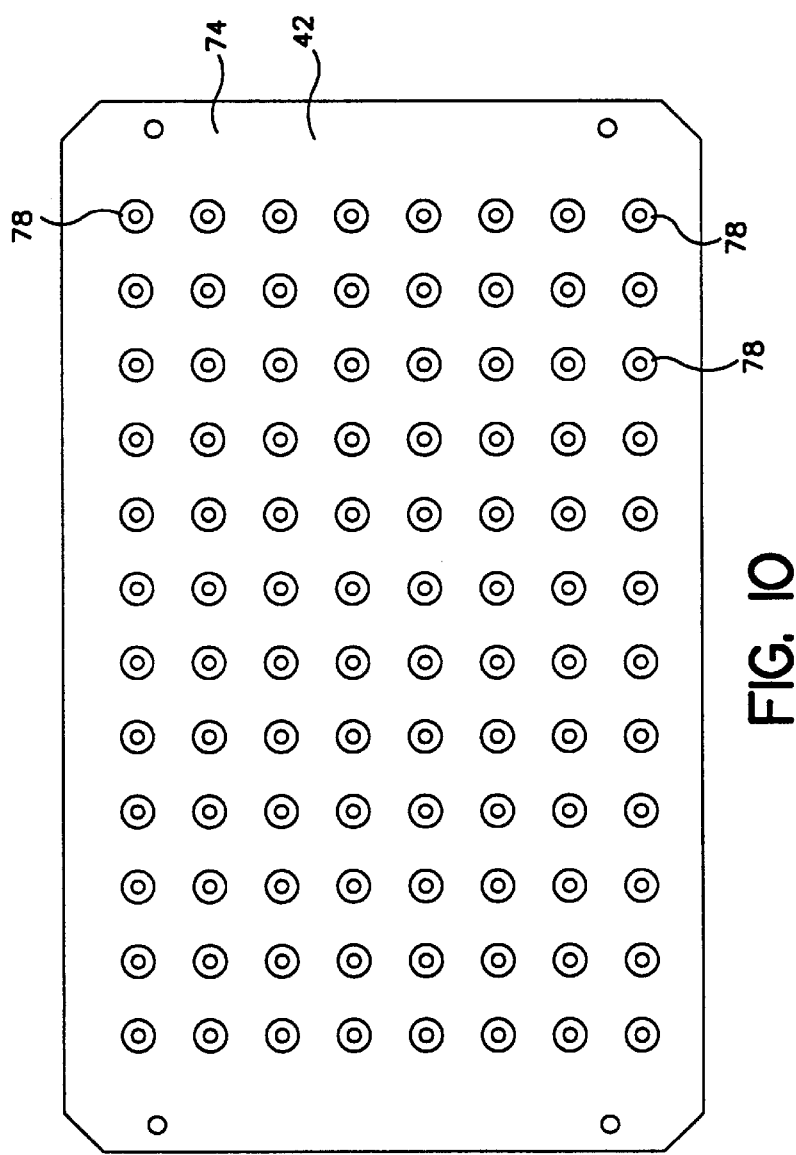
FIG. 10 is a top view of a cap system plate assembly used with the manifold assembly of FIGS. 2–6 and the channel block assembly of FIGS. 7–9.
Figure 11:
FIG. 11 is a side view of the cap plate assembly of FIG. 10.
Figure 12:
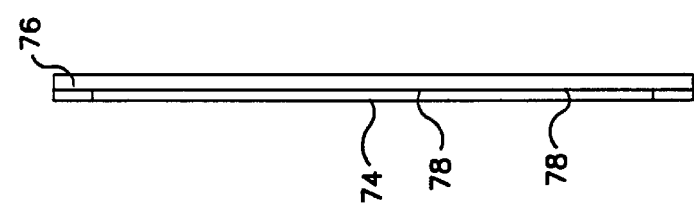
FIG. 12 is an end view of the cap plate assembly of FIGS. 10 and 11.

Referring now to FIGS. 10–12 where the capping assembly 43 is shown, it is seen that the capping assembly 43 includes a rigid metal plate 74 and a polymeric system sheet 76 of non-chemically reactive, elastic, polymeric material. The polymeric material 76 underlies an array of ninety-six holes 78 in the plate 74, which holes align with the open tops of the vials 12 in the assembly of FIG. 1. The polymeric septum sheet provides a closure for the open top of each reaction vessel 12. When the needles 22 (FIG. 1) are lowered with the washing manifold 20, the needles pass through the holes 78 and penetrate the polymeric septum sheet 76 so that fluid from the reservoirs 24 or 26 can be injected into the reaction vessels 12. When the needles 22 are withdrawn, the material of the polymeric septum sheet seals the open tops of the reaction vessels 12 so that vapors are contained within the reaction vessels when the reaction vessels are agitated by the vortexer 18.

Referring now to FIGS. 13–15 where the vortexer 18 mounting plate 16 is shown, the vortexer mounting plate 16 is used to rigidly restrain the reaction grid assembly 14 (FIG. 1) to the moving portion of the vortexer as the reaction grid assembly is agitated. The vortexer mounting plate 16 includes a base 80 with a back flange 81 and a pair of side flanges 82 and 83 which cooperate to hold the reaction grid assembly 14 (see FIGS. 1, 7–10) which is slid onto the base 80 from an open front 84 of the mounting plate 16.

Figure 17:
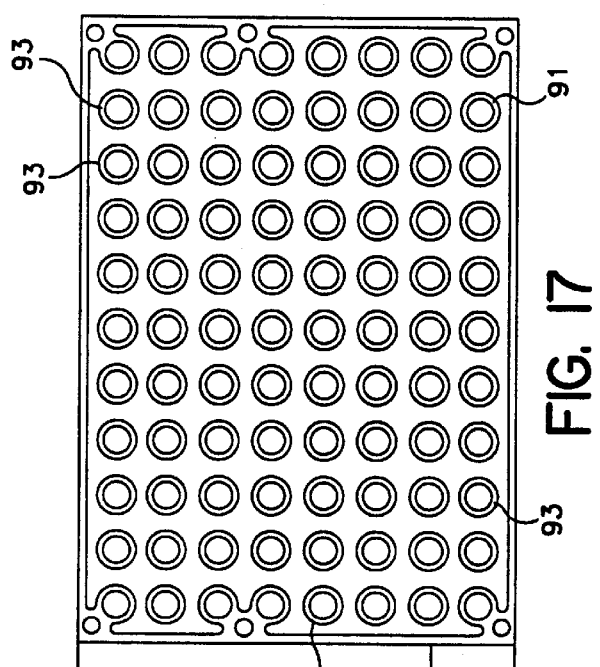
FIG. 17 is a bottom view of the thermal block assembly of FIG. 16.
Figure 18:
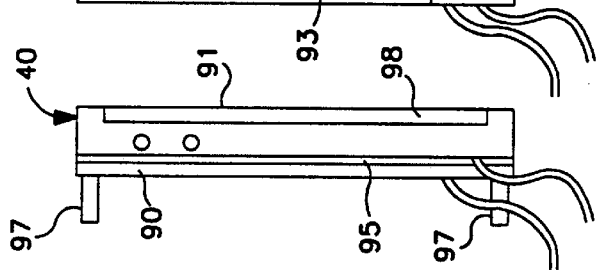
FIG. 18 is an end view of the thermal block assembly of FIGS. 16 and 17.
Figure 16:
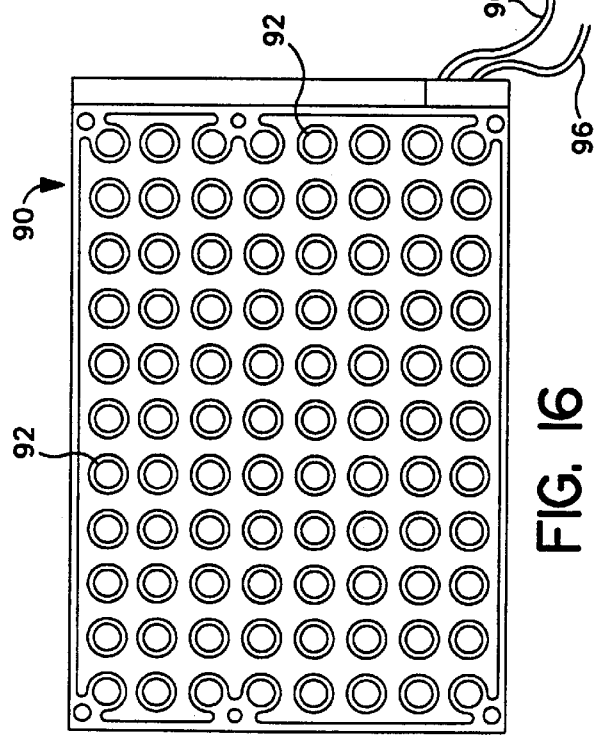
FIG. 16 is a bottom view of a thermal block used with a reaction grid assembly shown in FIG. 1.

Referring now to FIGS. 16, 17 and 18, there is shown the thermal control system 40 (see FIG. 1) which is used to either heat the contents of the reaction vessels 12 or to cool the contents. The thermal control system comprises a bottom plate 90 and a top plate 91, the bottom plate 90 having ninety-six apertures 92 therein which align with ninety-six apertures 93 in the top plate 91. A silicon heating pad 95 is sandwiched between the top heater block 91 and the bottom heater block 90 and is connected by leads 96 to a heater control 41 (see FIG. 1) which maintains the desired heat level. Four spacers 97 project from the bottom block 91 to keep the heater assembly slightly spaced from the manifold plate 30 in order to raise the thermal block assembly 40 to the level of the fritt 12b in the reaction vessels 12. While the heating pad 95 is preferred, other heat approaches may be employed such as wrapping a heating plate, such as the plate 91, with wire to provide electric resistance heating 82 or circulating heated fluid through channels in the plate.

If it is desired to cool, rather than heat the reaction, the top block 91 has an indentation 98 therein for containing a cooling material such as, for example, dry ice. In another approach, cooled ethylene glycol may be circulated through channels in the top block 91. It is emphasized that the reaction system 10 of FIG. 1 need neither be heated or cooled if the reactions in the reaction vessels 12 are to occur at room temperature, or if temperature control is not critical, in which case, the thermal block system 40 need not be used.

Figure 19:
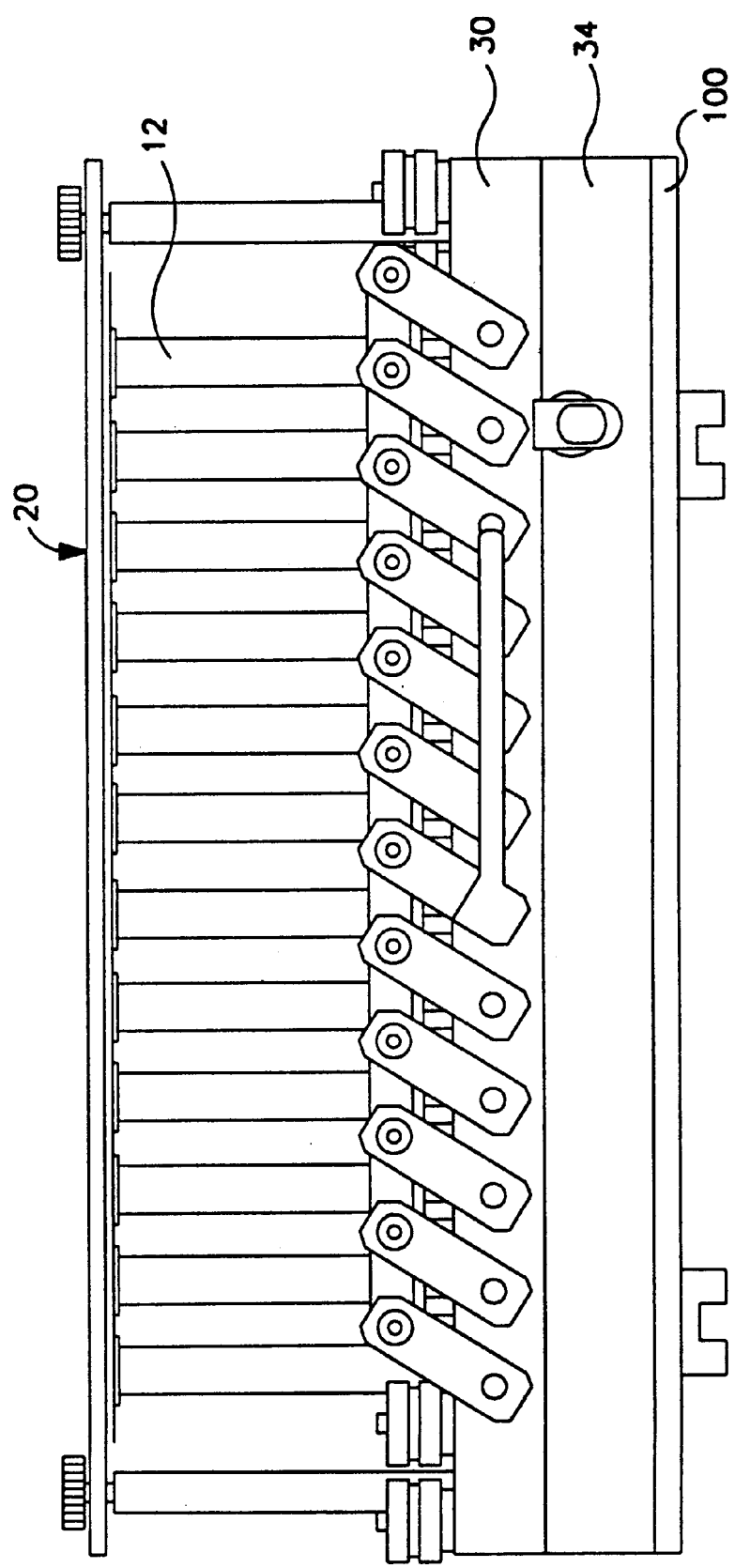
FIG. 19 is a side view of the reaction grid assembly ready for loading by a robotic loader.

The reaction procedure is perhaps best understood in the context of FIGS. 19–22. In FIG. 19, the reaction vessels 12 are assembled with the manifold valve block 30, the channel block 34 and capping plate assembly 20. This arrangement of parts is mounted on a robot deck mounting plate 100 for the loading phase of the procedure in which the reaction vessels 12 are loaded with fritts 12b and chemical linkers at a robotic loading site different from the site shown in FIG. 1.

Figure 20:
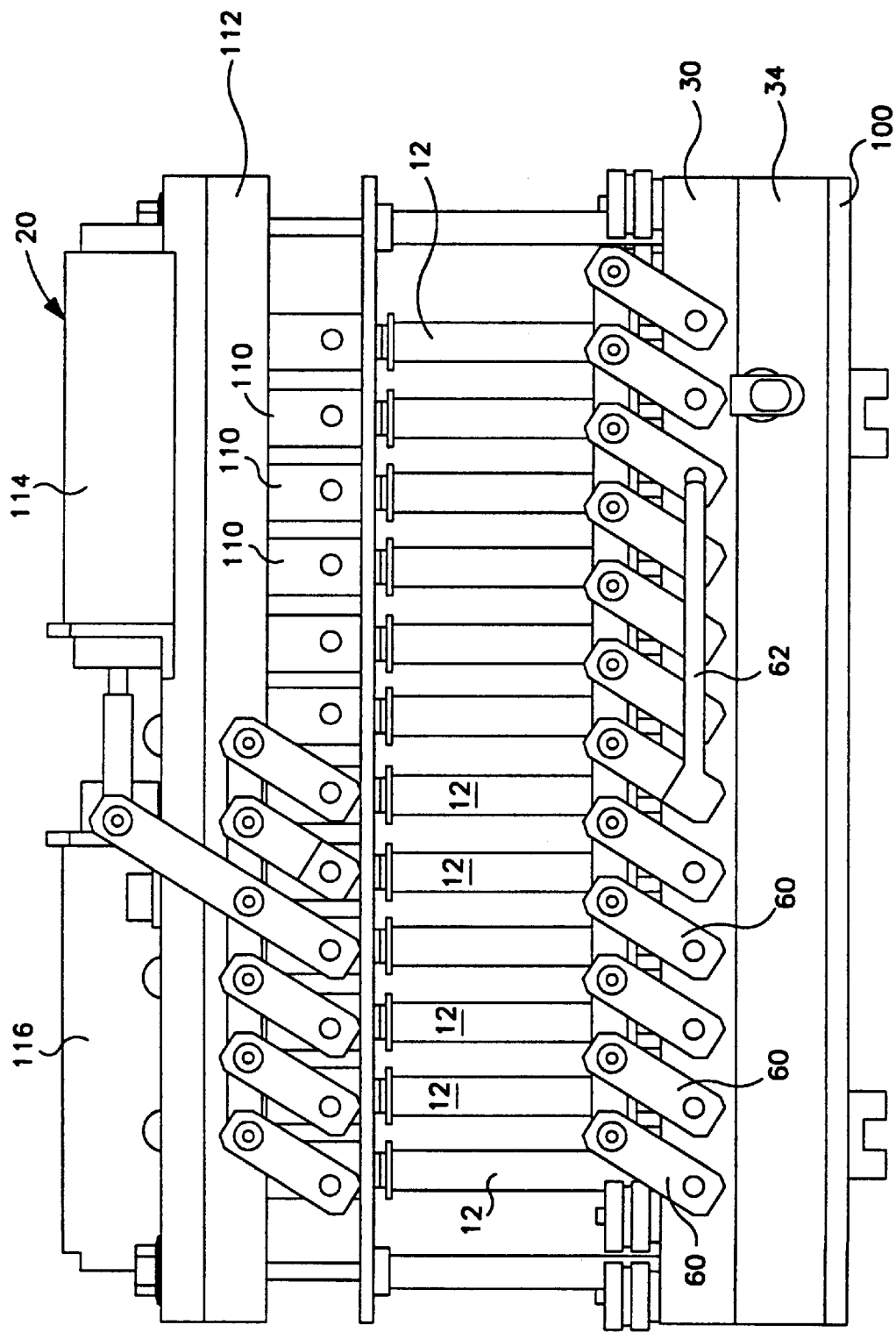
FIG. 20 is a side view of the reaction grid assembly with a wash system mounted thereon.

As is seen in FIG. 20, the arrangement of FIG. 19 is brought into contact with the fluid delivery system 21, which includes the needles 22 (FIG. 1). In the fluid delivery system 21, a plurality of valves 110 in a manifold 112 are simultaneously opened by hydraulic cylinders 114 and 116 positioned on opposite sides of the manifold 112 to cause washing fluid or solvent from the container 24 (FIG. 1) to flow into the ninety-six reaction vessels 12. While fluid is flowing into the reaction vessels 12, the ninety-six valve inserts 51 connected to each reaction vessel are held closed by the links 60 and operating handle 62 (also see FIGS. 4–6).

Figure 21:
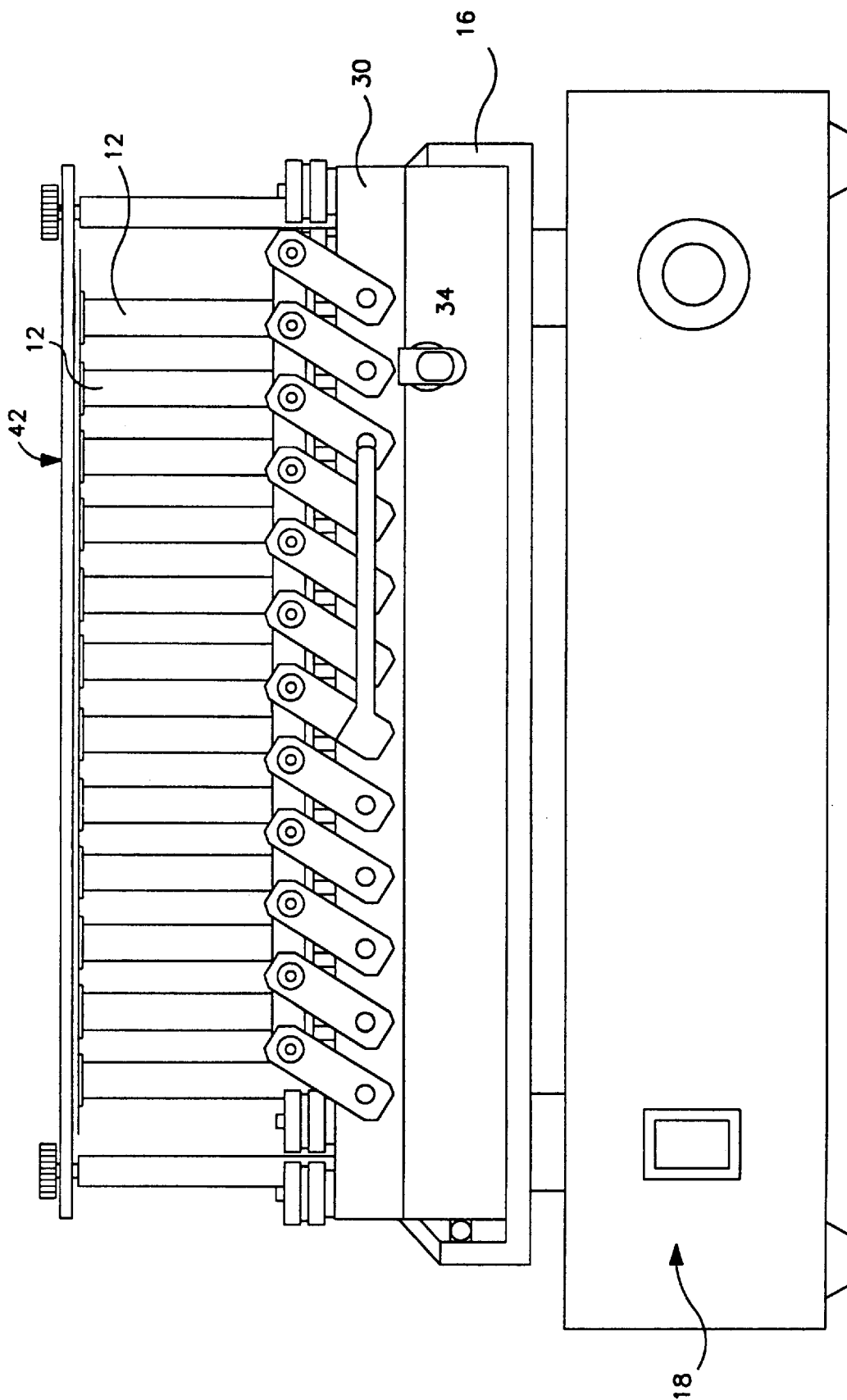
FIG. 21 is a side view showing the reaction grid assembly mounted on a vortexer.

Referring now to FIG. 21, after the reaction vessels 12 have been filled, the assembly of FIG. 19 is disconnected from the washing manifold assembly 20 of FIG. and agitated by the vortexer 18.

Figure 22:
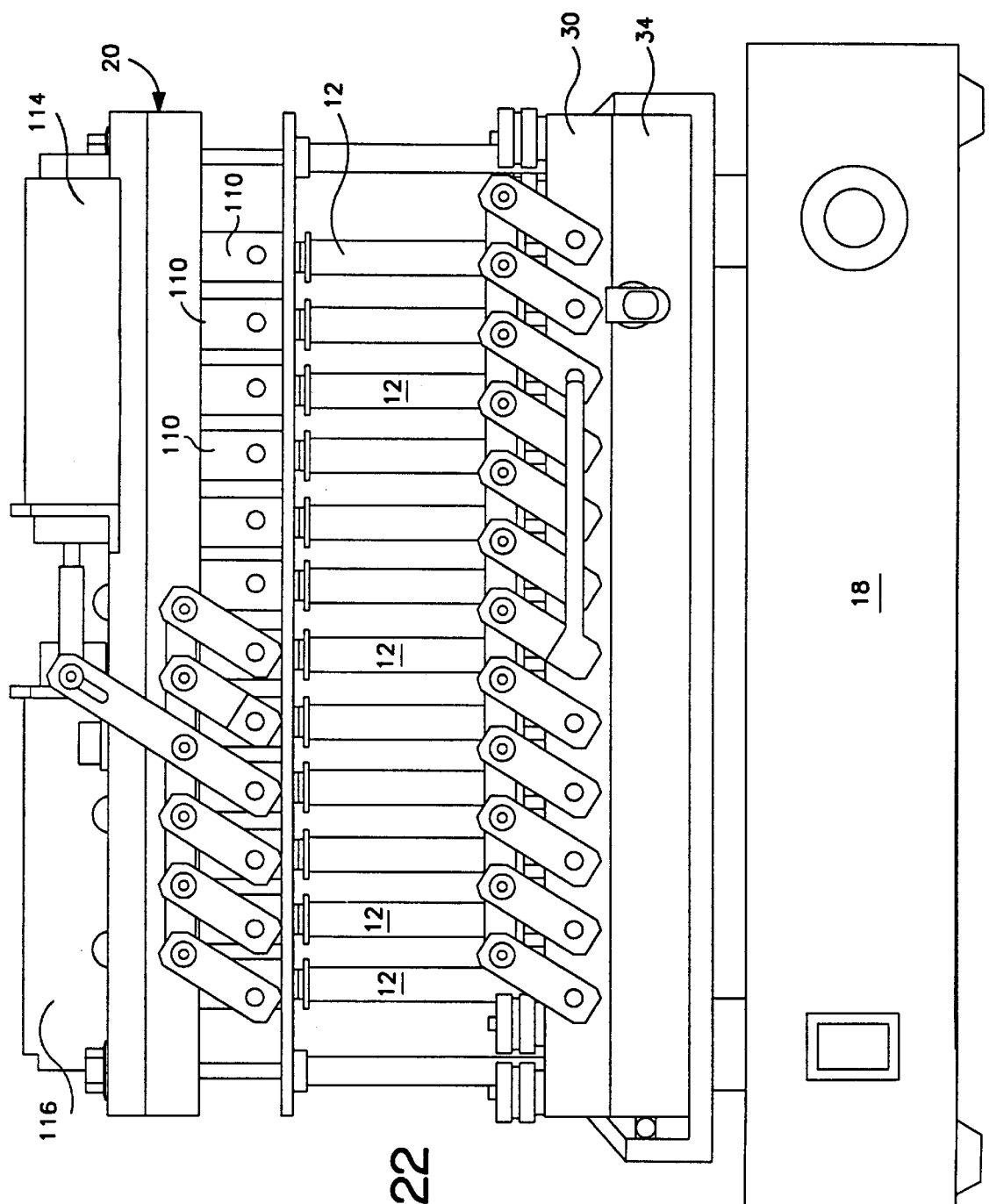
FIG. 22 is a side view showing the reaction grid assembly and wash system mounted on the vortexer.

Referring now to FIG. 22, after agitation by the vortexer 18 has stopped, the valves 51 in the manifold valve block 30 are opened and the liquid in the reaction vessels 12 is drawn through the filters 12a in the reaction vessels and into the channel block 34 by suction applied to line 36 (see FIGS. 7–9) by the vacuum pump 39 (see FIG. 1). Depending on the chemical processing being performed, the washing and evacuating step may be performed once or repeated a number of times with various fluids.

The reaction phase of the method employing the system of the present invention is now complete with the sought after reaction products bonded to the fritts 12b in the ninety-six reaction vessels 12. It is now necessary to cleave the reaction products from the fritts 12b and to collect the reaction products in vials. This is accomplished by the components of the cleavage system set forth in the following description.

The Cleavage System

Figure 23:
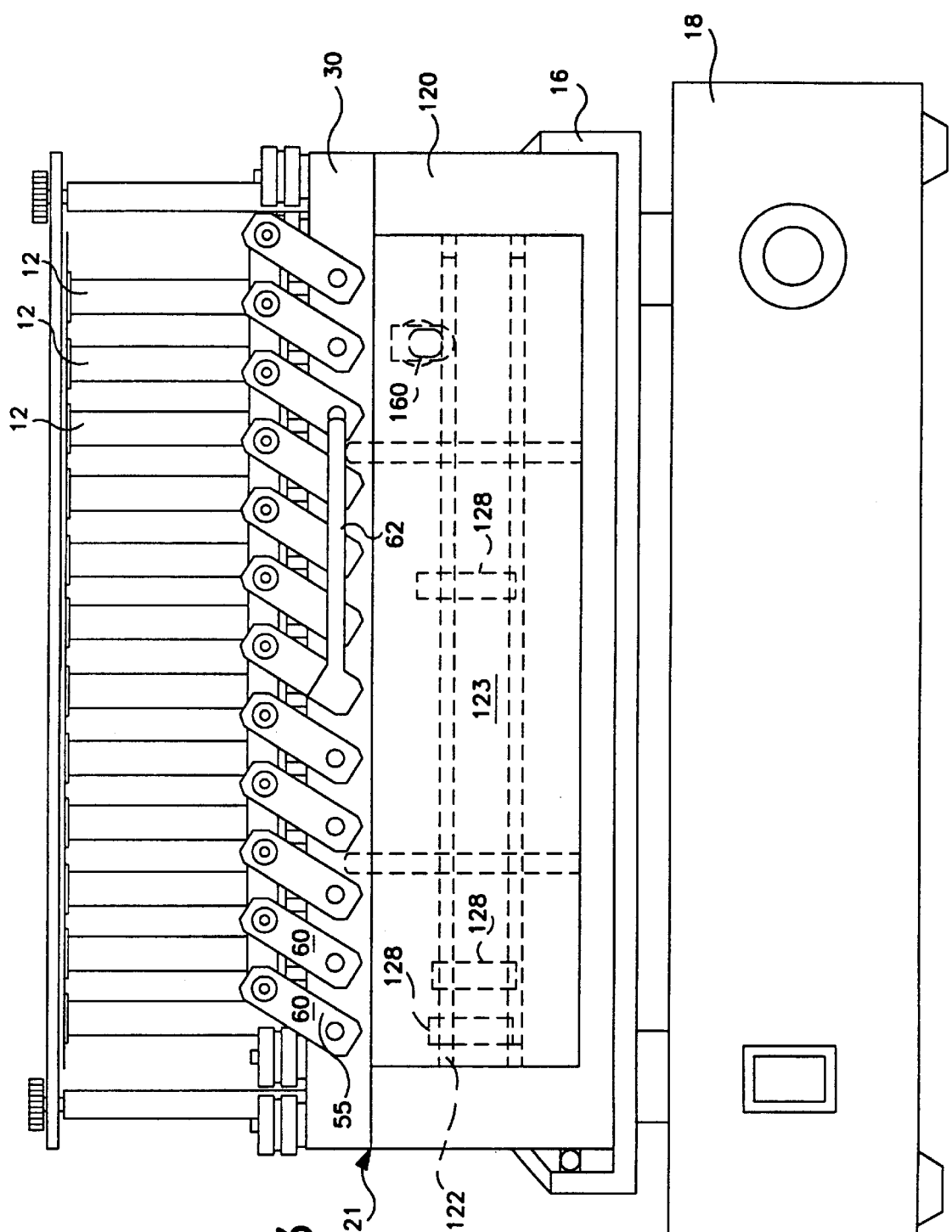
FIG. 23 is a side view showing the cleavage system mounted on the vortexer.

As is seen in FIG. 23, after the washing step of FIG. 22, the manifold valve block 30 is separated from the channel block 34 and mounted on a cleavage block 120 to form a cleavage assembly 121 in which a vial tray rack 122 (shown in dotted lines) is mounted in a cavity 123 of the cleavage block 120. The cleavage block 120 is in turn retained on the universal mounting plate 16 mounted on the vortexer 18. The vial rack 122 is loaded with ninety-six one dram vials 128 for receiving the reaction products from the reaction vessels 12 upon simultaneously opening the valves 51 in the manifold valve block 30 (see FIGS. 3–6).

Figure 26:
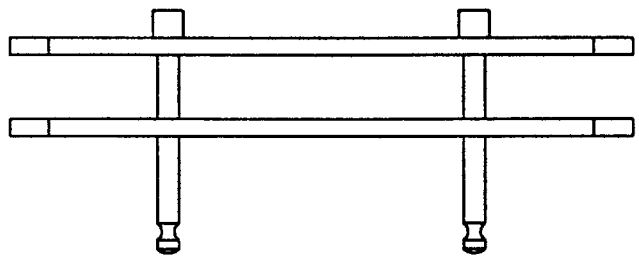
FIG. 26 is an end view of the vial rack assembly of FIGS. 16 and 17.
Figure 24:
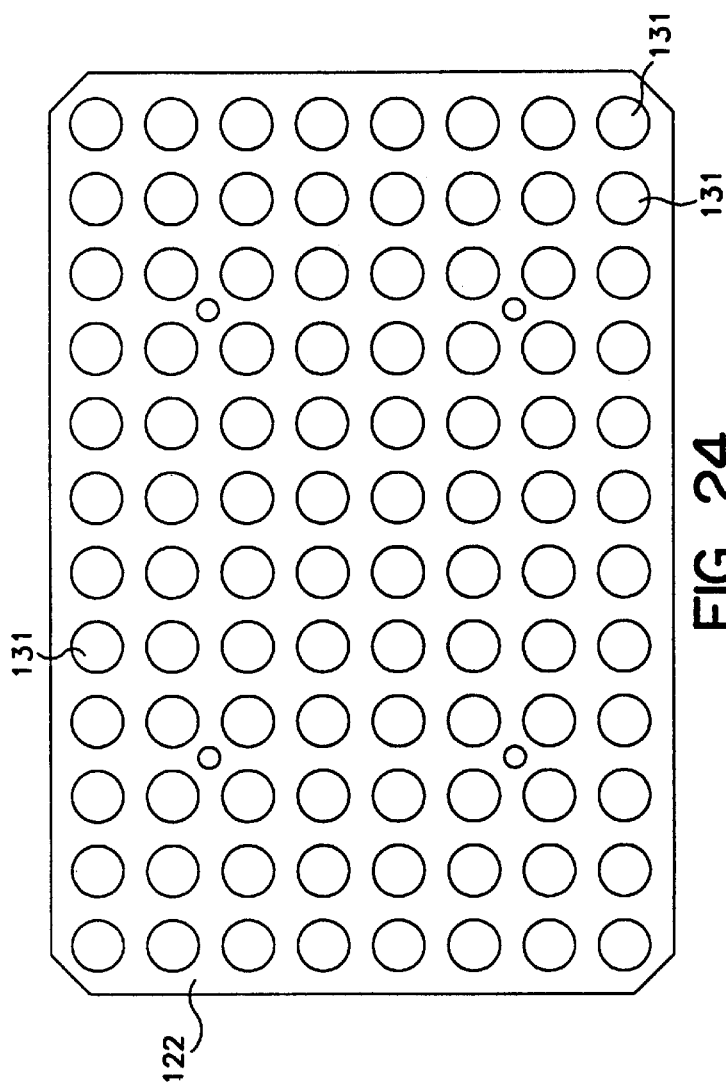
FIG. 24 is a top view of a vial rack assembly utilized with a cleavage system employed to collect reaction products after the reaction in the reaction vessels is complete.
Figure 25:
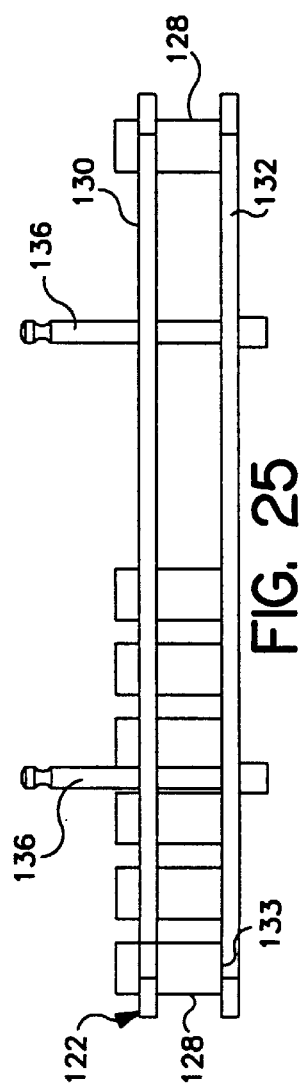
FIG. 25 is a side view of the vial rack assembly.

Referring now to FIGS. 24–26 where the vial rack 122 is shown removed from the cleavage block 120, it is seen that the vial tray has a top plate 130 with ninety-six holes 131 therethrough and a bottom plate 132 with ninety-six indentations 133 therein. The ninety-six vials 128 are mounted in the holes 131 with the bottoms of the vials resting in the indentations 133. Since it is necessary to have the vial rack 122 recessed within the cavity 123 so as to provide clearance for the male Luer connectors 53 of the valve inserts 51 (see FIG. 3), lifting pins 136 are provided which facilitate removal of the valve rack 122 from the cavity.

Figure 27:
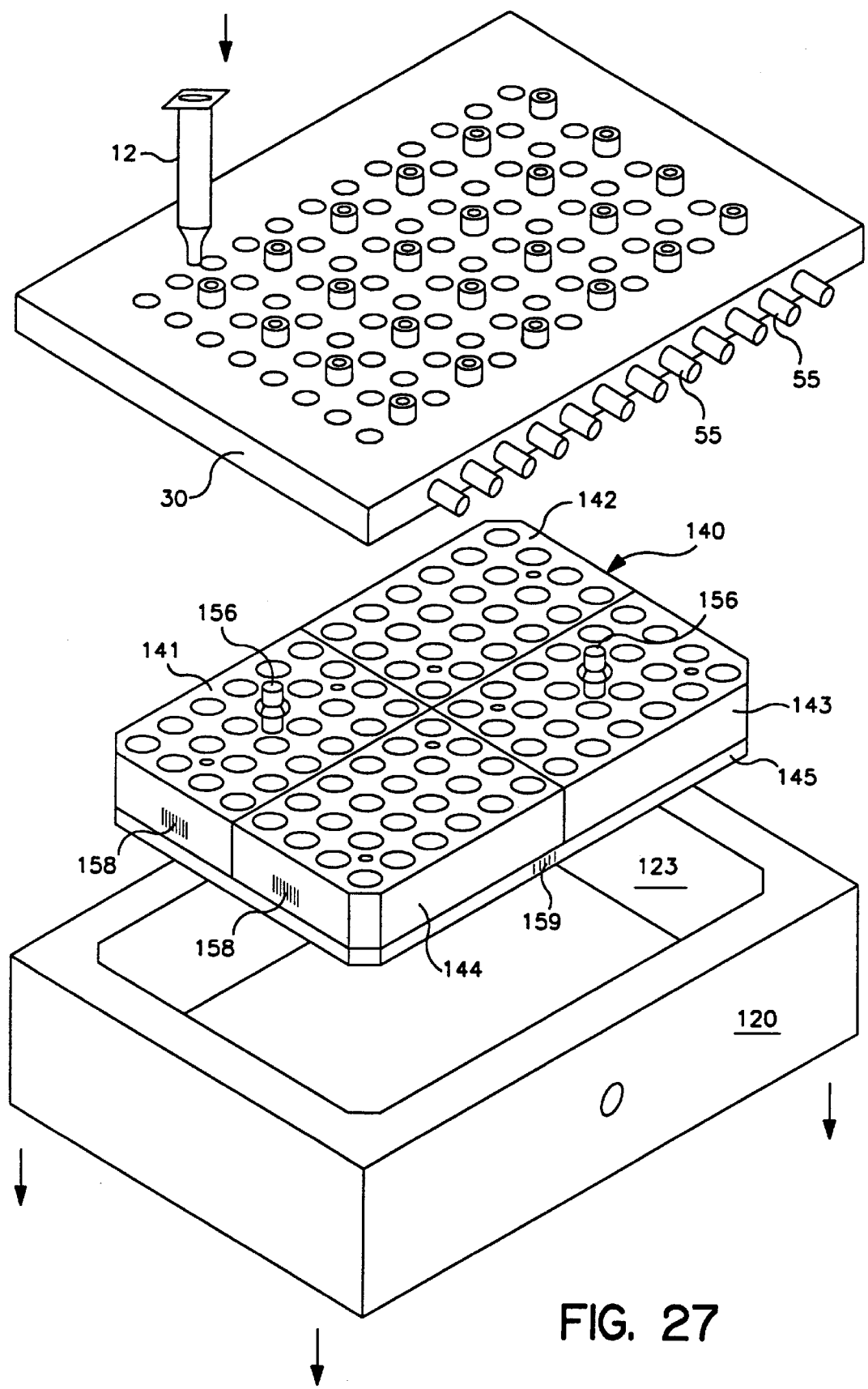
FIG. 27 is an exploded view, in perspective, of a preferred embodiment in which a composite vial rack having four sections mounted in the cleavage block.
Figure 28:
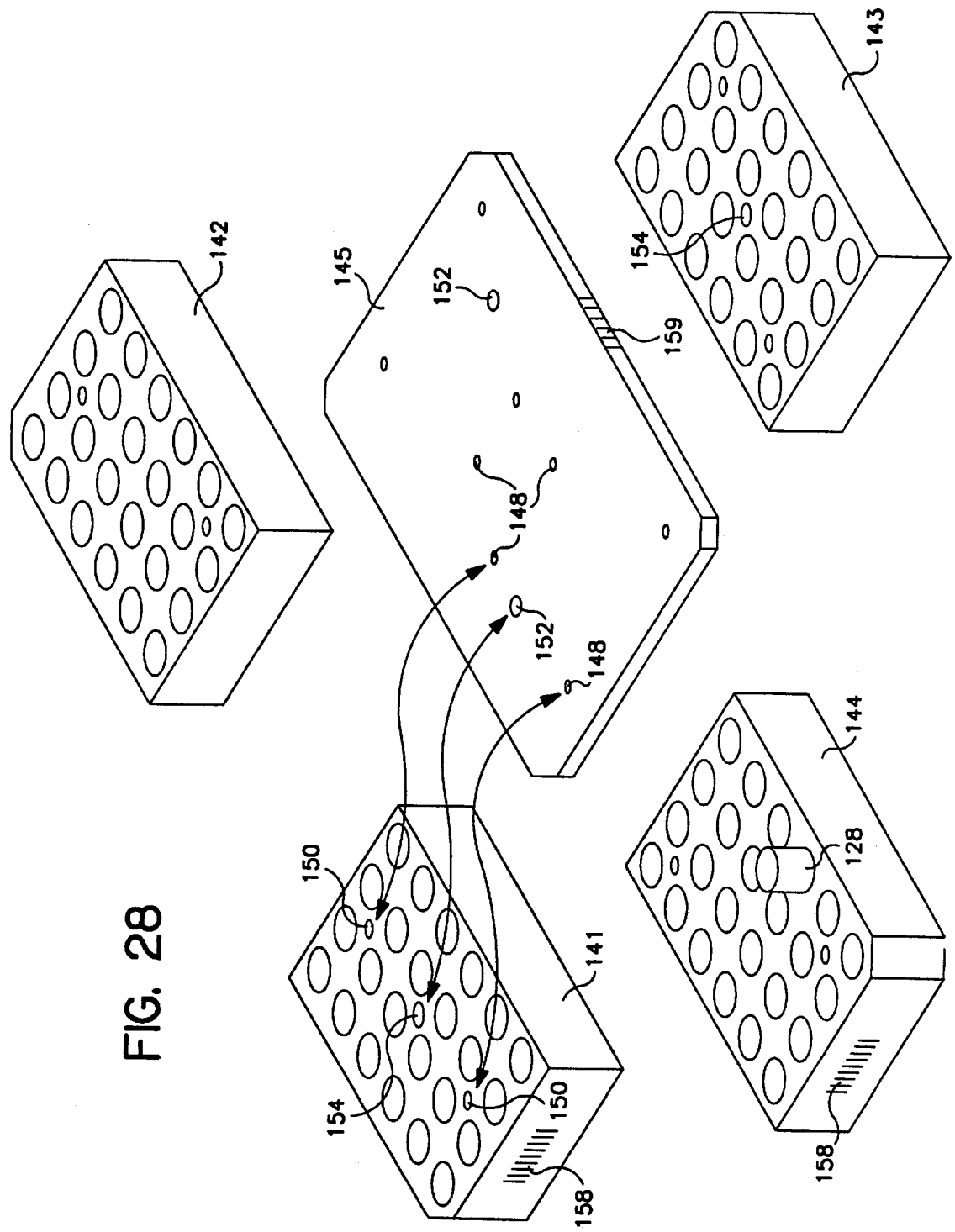
FIG. 28 is an exploded view showing the four vial rack section and a rack mounting tray of FIG. 27.

Referring now to FIGS. 27 and 28, where a second embodiment for supporting the vials 128 in the cleavage block 120 is shown, it is seen that the second embodiment is a composite vial tray 140 having four segments 141, 142, 143 and 144. The four segments 141–144 are mounted on a vial rack mounting tray 145. As is seen in FIG. 28, the four vial mounting racks 141–144 are separable into racks that hold twenty-four one dram vials 128 each. The vial racks 141–144 each fit in a speed vac which spins four racks per cycle.

The rack mounting tray 145 includes an array of pin holes 148 which array is unique for each of the racks 141–144 so that the racks have a unique location to facilitate identifying the reaction products in the vials 128. Pin holes 148 receive pins through holes 150 in the separate vial racks 141–144 to accomplish the alignment. Larger holes 152 in the vial rack mounting tray 145 can receive projecting knobs 156 to facilitate pulling the entire vial rack assembly from the cavity 123 in the cleavage block 120.

In order to facilitate handling and identifying the reaction products in the vials 148, separate bar codes 158 are located on each of the vial racks 141–144 and a bar code 159 is on the rack mounting tray 145 to identify the batch of ninety-six vials 128 containing reaction products cleaved in one operation.

Figure 29:
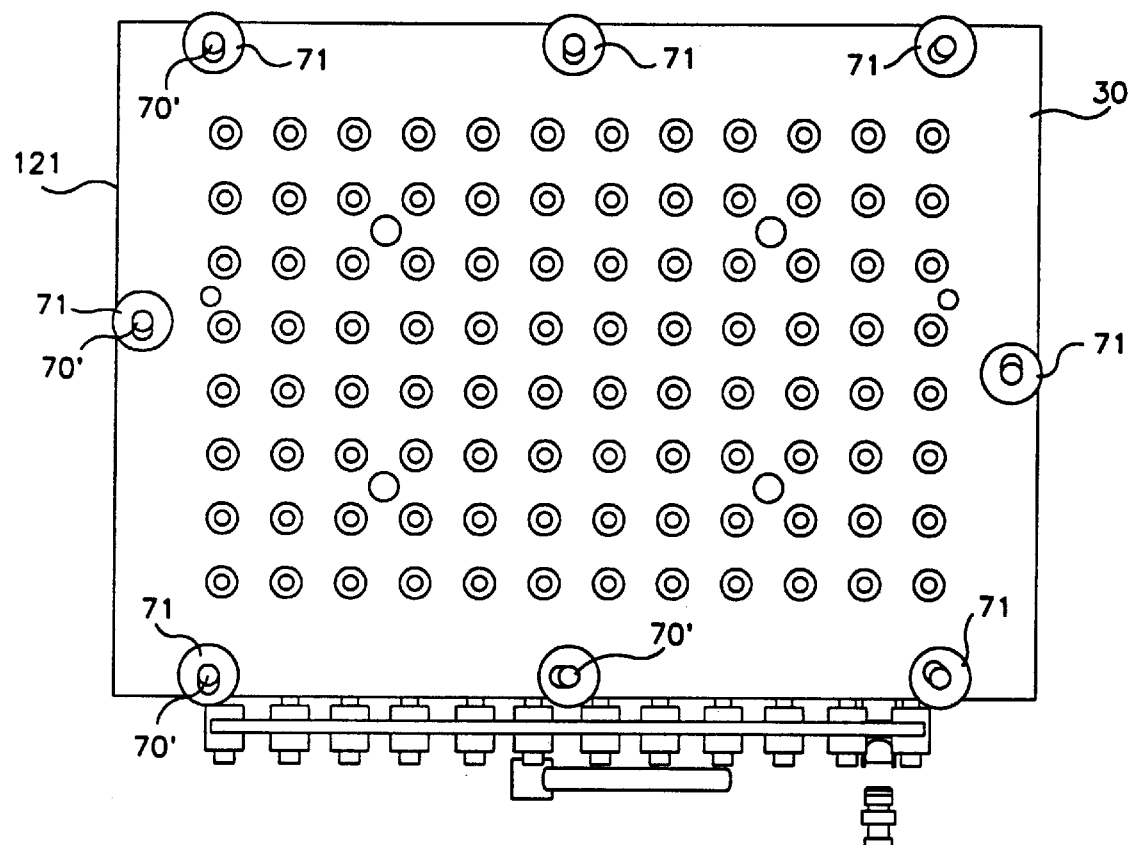
FIG. 29 is a top view of a cleavage system assembly which is comprised of the valve manifold assembly of FIGS. 4–6, and a cleavage block of FIGS. 35–37 which receives the vial rack assembly therein and the channel system assembly thereon.
Figure 30:
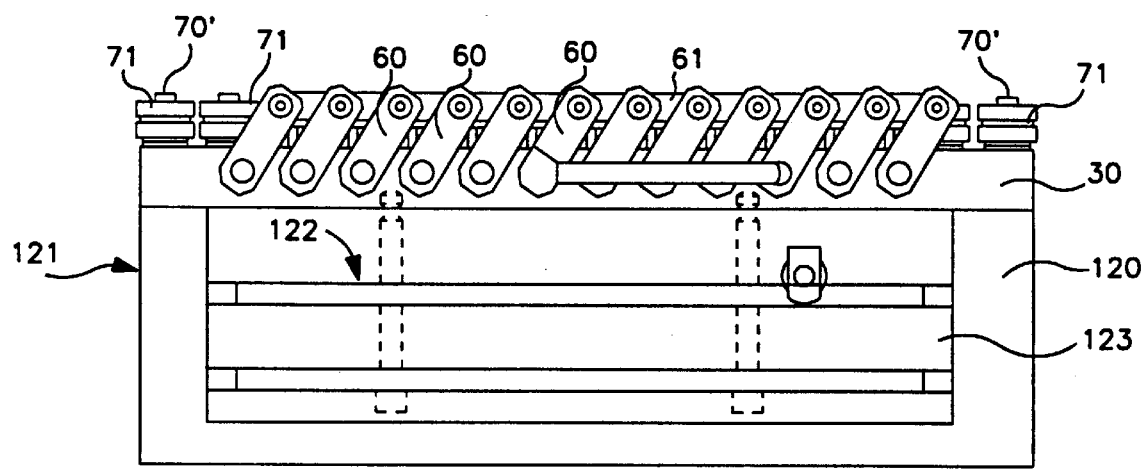
FIG. 30 is a side view of the cleavage system assembly of FIG. 29.
Figure 31:
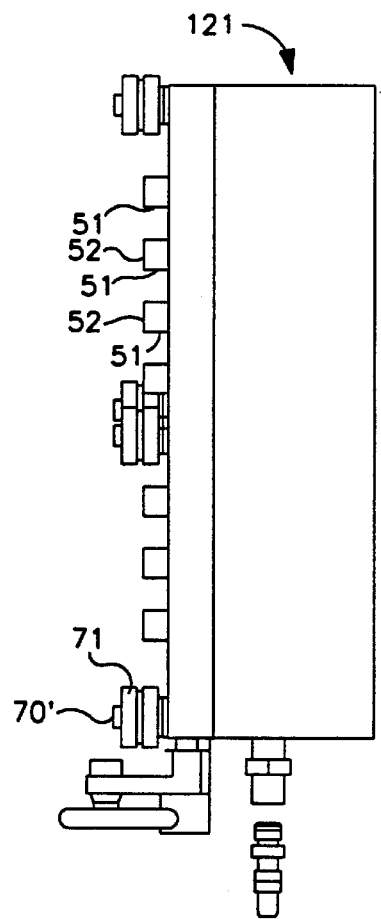
FIG. 31 is an end view of the cleavage system assembly of FIGS. 29 and 30.

Referring now to FIGS. 29–31 and FIGS. 32–34, it is seen that the cleavage block 120 receives the vial rack 122 of FIGS. 24–26 or the composite vial rack 140 of FIGS. 27 and 28 (only the vial rack 122 is shown). As is seen in FIGS. 29–31, in the cleavage operation, it is the cleavage block 120 which is attached to the manifold valve block 30, rather than the channel block 34 being attached to the manifold valve block 30, as is the case in FIGS. 32–34. The substitution of the cleavage block 120 for the channel block 34, is rapidly and conveniently accomplished by removing the quick connect fasteners 71 (also see FIG. 8). From comparing FIGS. 29–31 to FIGS. 32–34, it is readily apparent that changing from the reaction phase to the cleavage phase is rapidly accomplished by simply substituting the cleavage block 120 for the channel block 34 by loosening and fastening the quick connect fasteners 71.

Further in this regard and referring to FIGS. 35–37, it is seen that the cleavage block 120 has a top structure which provides a coupling face 160 which is substantially identical to the top structure which provides the coupling face 69 of the channel block 34 shown in FIGS. 7–9 in that it has identically spaced attached attachment pins 70', as well as an identically placed gasket 72'. The coupling block 120 is, therefore, as stated, rapidly interchangeable with the channel block 34. Accordingly, it is readily apparent that the interface between the manifold valve block 30 and the channel block 34 is substantially identical to the interface between the manifold valve block 30 and the cleavage block 120. The cleavage block 120 also includes a quick connect fitting 162 for attachment to vacuum line 36 (see FIG. 1).

Referring again to the assembly of FIG. 23, after the reagent vessels 112 have been agitated by the vortexer 18, the ninety-six valves 51 in the valve manifold 30 are opened simultaneously by operating the handle 62 which rotates the linkages 60 to rotate the valve stems 55. With the opening of the insert valves 51, a vacuum is applied to the quick connect fitting 60 by the vacuum pump 39 which causes the solvent in the reaction vessels 12 which has cleaved the reaction products from the fritts 12b in the reaction vessels to flow with those reaction products into the array of ninety-six vials 128. The vials 128 are then removed from the cavity 123 in the cleavage block 120 and processed to separate the reaction products from the solvent.

Subcomponents and Systems of the First Embodiment

FIGS. 38–45 are directed to subcomponents and system which facilitate the operation of the aforedescribed reaction grid system and cleavage system.

FIGS. 38–40 are views of the robot deck mounting plate 100 shown in FIGS. 19 and 20 which is used to mount the reaction grid assembly 14 on a robotic machine which loads chemical agents in the reaction vessels 12 prior to mounting the reaction grid assembly on the vortexer 18 shown in the reaction station system 10 of FIG. 1.

Figure 41:
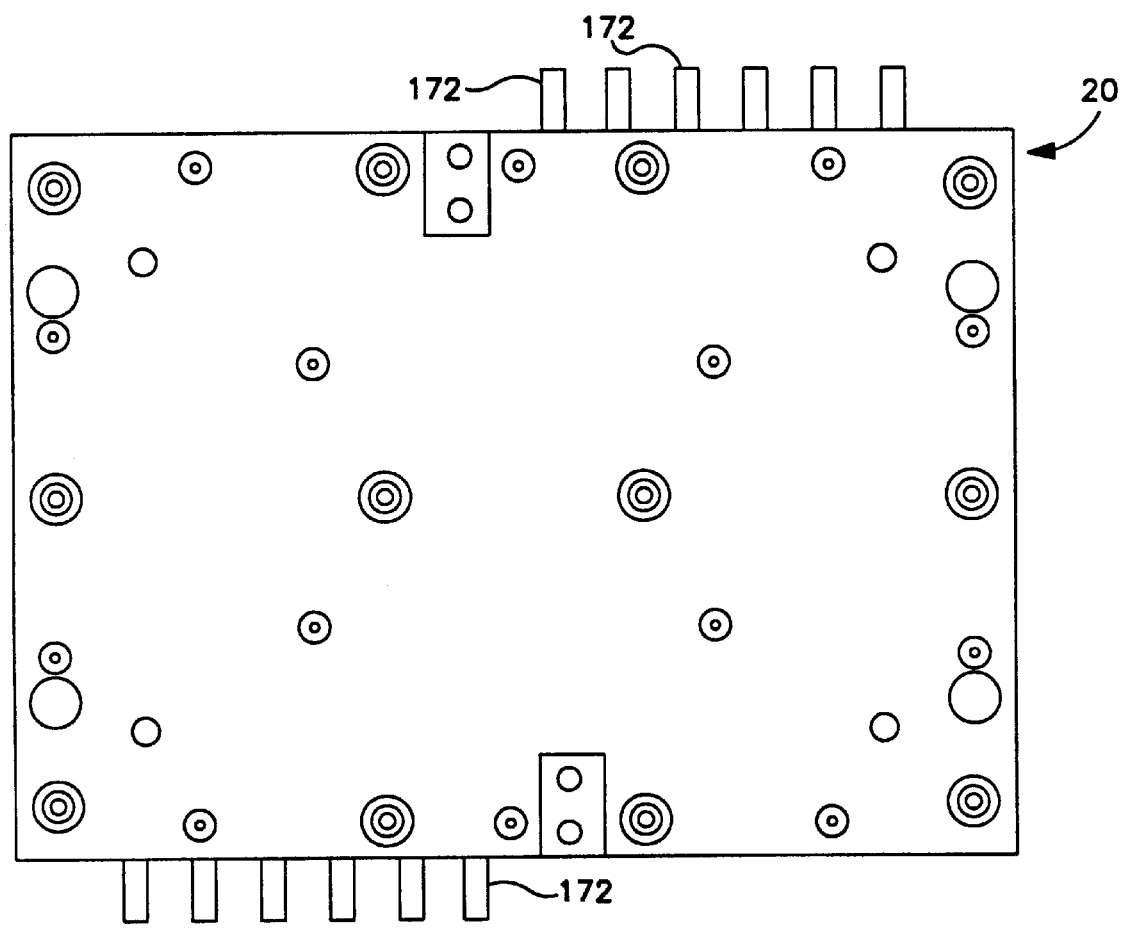
FIG. 41 is a top view of a wash system manifold assembly used with the system of FIG. 1.
Figure 42:
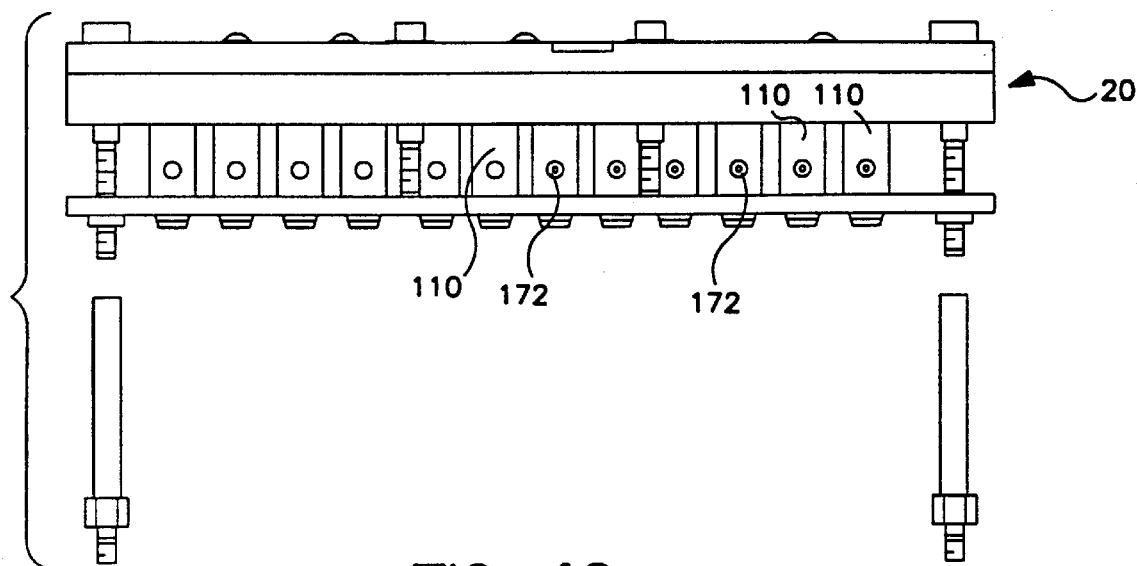
FIG. 42 is a side view of the wash system manifold assembly of FIG. 41.
Figure 43:
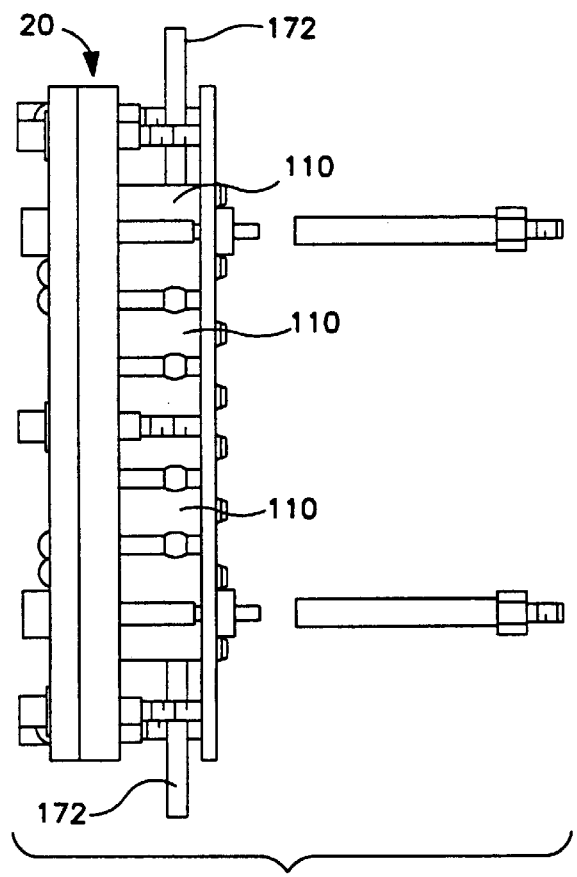
FIG. 43 is an end view of the wash system manifold assembly of FIGS. 41 and 42.
Figure 44:
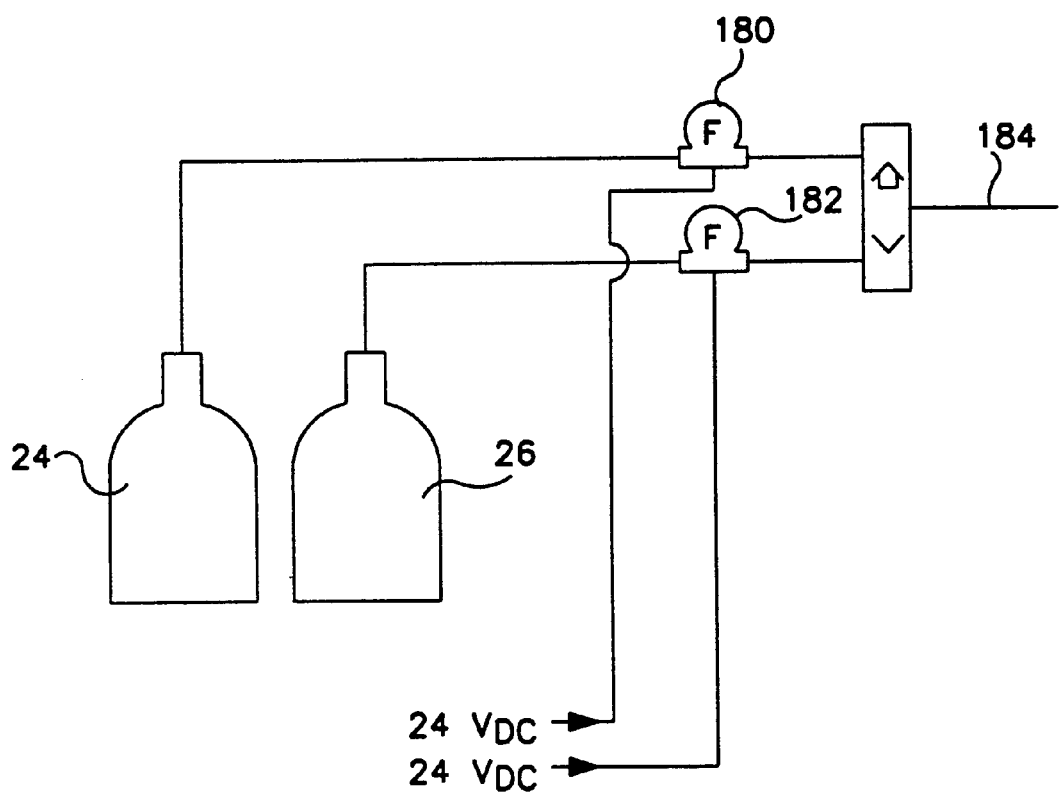
FIG. 44 is a diagrammatical view of a wash dispensing system.
Figure 46:
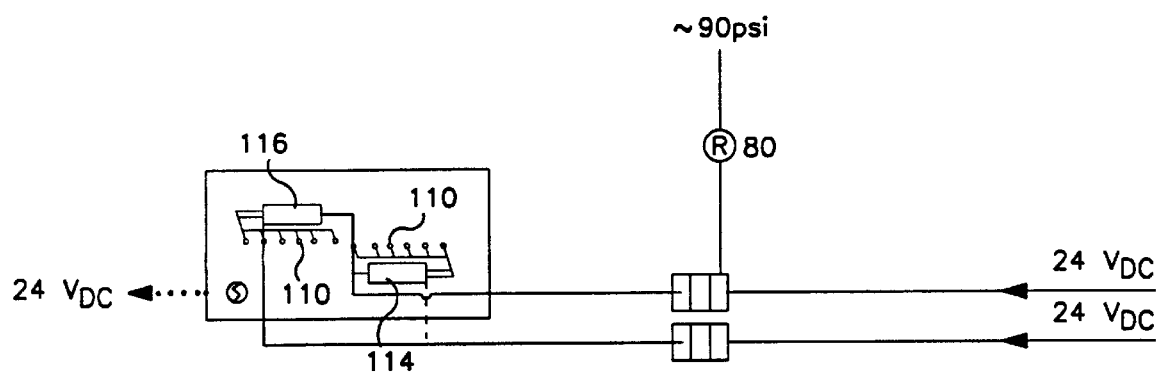
FIG. 46 is a diagrammatical view of a valve actuating system.

Referring now to FIGS. 41–43 where the fluid dispensing manifold 20 is shown in greater detail, it is seen that the washing manifold 20 includes a plurality of the valves 110 operated by valve stems 172 positioned on opposite sides of the manifold 20 to release simultaneously fluids for the fluid treatment steps of FIGS. 20 and 22, upon activating the hydraulic cylinders 114 and 116 shown in FIGS. 20, 22 and 46 to release the washing and reaction fluids in containers 24 and 26 of FIGS. 1 and 44.

Referring now to FIG. 44, there is shown a washing fluid bottle 26 and a solvent bottle 24 (also see FIG. 1) which are connected by valves 180 and 182 for selective dispensing of these liquids through a line 184 to the washing manifold 20 of FIGS. 1, 20, 22 and 41–43.

Figure 45:
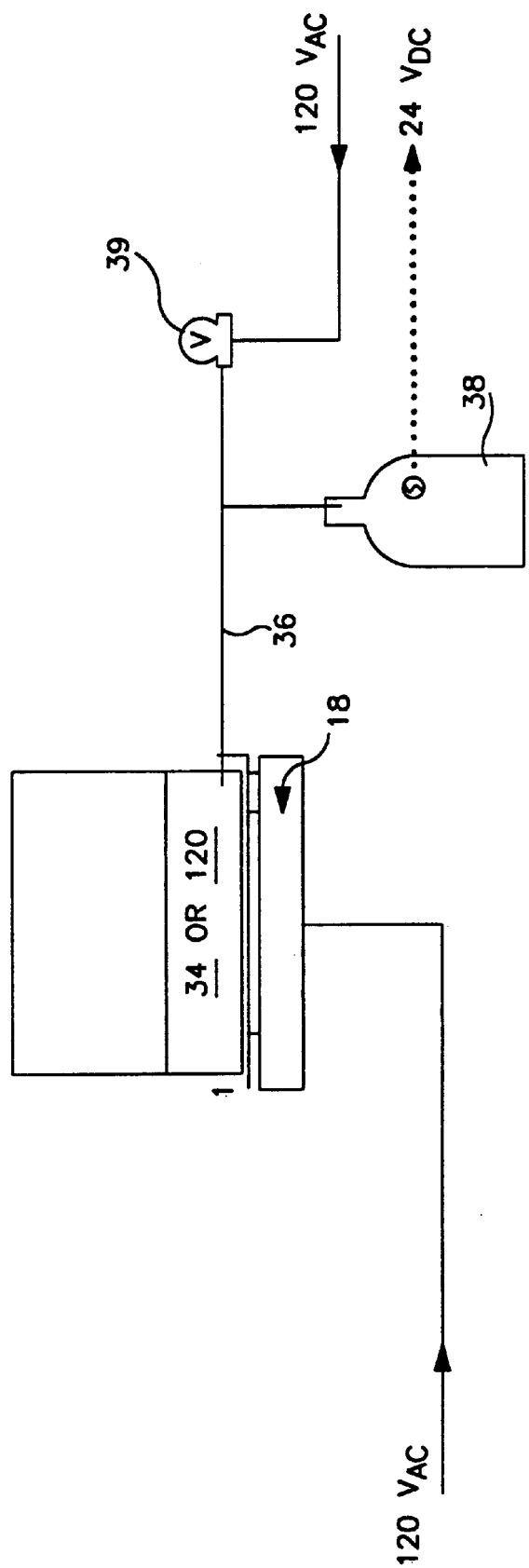
FIG. 45 is a diagrammatical view of a suction system for removing liquid from the assembly of FIG. 1.

Referring now to FIG. 45, there is shown the vacuum system for applying a vacuum to either the channel block 34 or cleavage block 120 via vacuum line 36 with waste washing fluid from the channel block 34 being accumulated in a waste container 38.

The resulting fluid dispensing apparatus, systems and methods resulting from combining the features of FIGS. 1, 20, 22, 44 and 46 enables rapid, simultaneous washing and treating of the contents in the ninety-six reaction vessels 12 while the evacuating system of FIG. 45 cooperates with both the channel block 34 and the cleavage block 120 to remove the fluids from the reaction vessels 12 to the waste container 38 or the vials 128, respectively.

By utilizing the manifold valve block 30 to retain and release various washing fluids and the reaction products within and from the reaction vessels 12, as well as the selected fluid collection arrangement provided by channel block 34 and cleavage block 120, the convenience, speed and efficiency of simultaneously generating new compounds is further facilitated by employing the fluid handling system of FIGS. 1, 20, 22 and 41–46 therewith.

Referring now to FIG. 46, there is shown a valve actuating system for gang actuating the valves of the washing manifold 112 shown in FIGS. 20, 22 and 41–43, wherein pneumatic cylinders 114 and 116 open valves 110.

EXAMPLE

Example 1

Solid Phase Chemical Synthesis (General)

The reaction grid is used to perform multiple solid phase chemical synthesis of organic molecules in a matrix format. The reaction vessels 12 are filled with solid support resins and chemical templates are attached thereto via appropriate linkers. Subsequently, chemicals are added to the reaction vessels through the top of the syringe barrel, thereby permitting chemical transformations and reactions to occur on the templates attached to the solid support beads. The sealed reaction grid and filters used in the reaction vessels 12 prevents chemical reagents from leaking out of the reaction vessels during the reaction cycles.

After a desired chemical transformation has been performed, the beads are rinsed free of excess chemicals in a wash cycle by the application of vacuum to the block. The vacuum source is connected to the block through the outlet port. This allows liquid waste to drain from each of the reaction vessels through the inlet holes into the drainage channel and then to the main channel and finally into a waste trap. Subsequently, the beads are then washed repeatedly with wash solvent and again the waste removed by suction via the outlet connection port connected to the vacuum source.

Following completion of the transformations in each of the reaction vessels 12 and the washing and rinsing of the solid support resin, the manifold valve plate or block 30 is removed from the channel block 34. Thereafter, the manifold valve plate or block 30 is connected to a second block which is the cleavage block 120. In this assembly, the cleavage block 120 has individual receptacles or vials 128 corresponding to the number of reaction vessels/inlet ports in the array in the top section. Thus, in an 8×12 matrix design, there are ninety-six individual vials 128 or test tubes positioned within the cleavage block 120.

In comparing the cleavage block 120 to the channel block 34 of the reaction grid, the cleavage block is a hollow block containing individual receptacles or vials 128 for the chemical products either in a tray or as a molded microtiter plate. The top section of the cleavage block 120 is the same as the top section of the channel block 34. In the cleavage block, the top sections and bottom sections are sealed to one another using an O-ring positioned therebetween just as in the reaction grid assembly 14. The male Luer connectors 53 of the valve inserts 51 (see FIG. 3A) function as spouts to the cleavage block 120, draining into individual chambers (vials 128) rather than into connected channels 65 as in the case of the channel block 34.

Example 2

Solid Phase Chemical Synthesis (Specifilc Example)

The following is a solid phase synthesis procedure for the synthesis of a library of 96 quinazoline analogs. These analogs are synthesized in an 8×12 matrix starting from a common anthranilic acid precursor. Treatment with 12 unique isocyanates and 8 unique alkylating agents provides 96 unique compounds.

The Second Embodiment of the Invention—FIGS. 47–54

Figure 47:
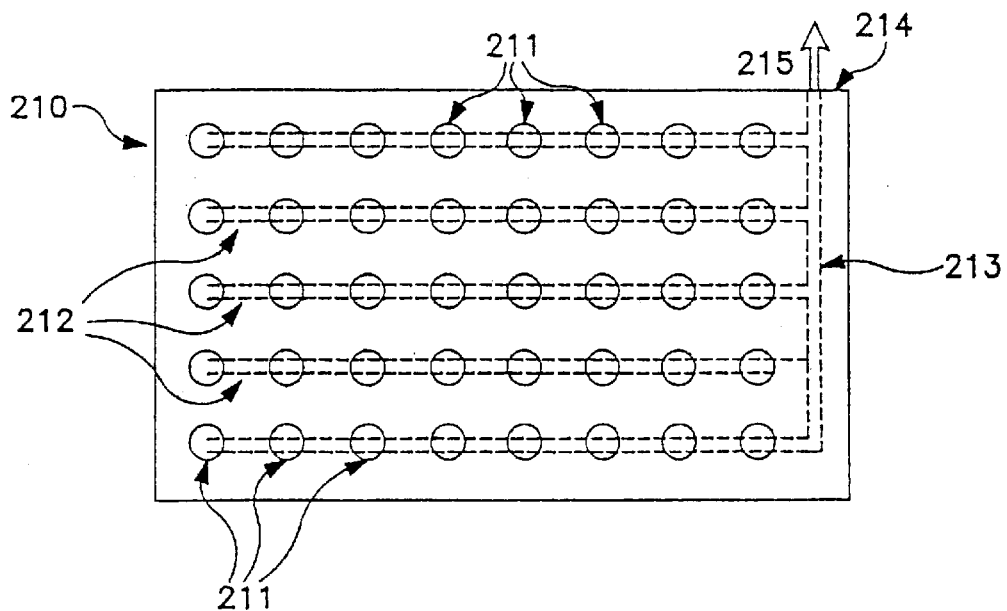
FIG. 47 illustrates a top view of a reaction grid in accordance with a second embodiment of the invention.

FIG. 47 illustrates a reaction grid 210 in accordance with the invention having an 8×5 array of inlet ports 211, i.e., 8 columns and 5 rows of inlet ports. For each row of inlet ports 211, there is a connecting channel 212. Thus, in each row, the 8 inlet ports are in direct fluid communication with a single channel. The five channels connect with a further main channel or connecting channel 213 which is illustrated as having a longitudinal axis perpendicular to the longitudinal axes of the channels 212. Main channel 213 is in fluid communication with an outlet port 214 in the side wall of the reaction grid 210. In operation, the inlet ports 211, channels 212, main channel 213 and outlet port 214 are in fluid communication. As a result, fluid drained from each of the reaction vessels connected to each of the inlet ports flows into channels 212, (e.g., 1/8" diameter) through main channel 213 (e.g., 1/8" diameter) and finally is discharged through outlet port 214 as shown by the arrow 215.

As mentioned above, FIG. 47 illustrates a top view of the reaction grid 210. The complete reaction grid can be manufactured as a single block. Preferably, however, the reaction grid is made of two rectangular portions as discussed above and as illustrated in FIG. 48 (see reference numerals 216 and 217) which form substrates. When the bottom section of the reaction grid is provided with inlet port extensions, then the view illustrated in FIG. 47 can also represent the top view of the bottom section of the reaction grid 210.

Figure 48:
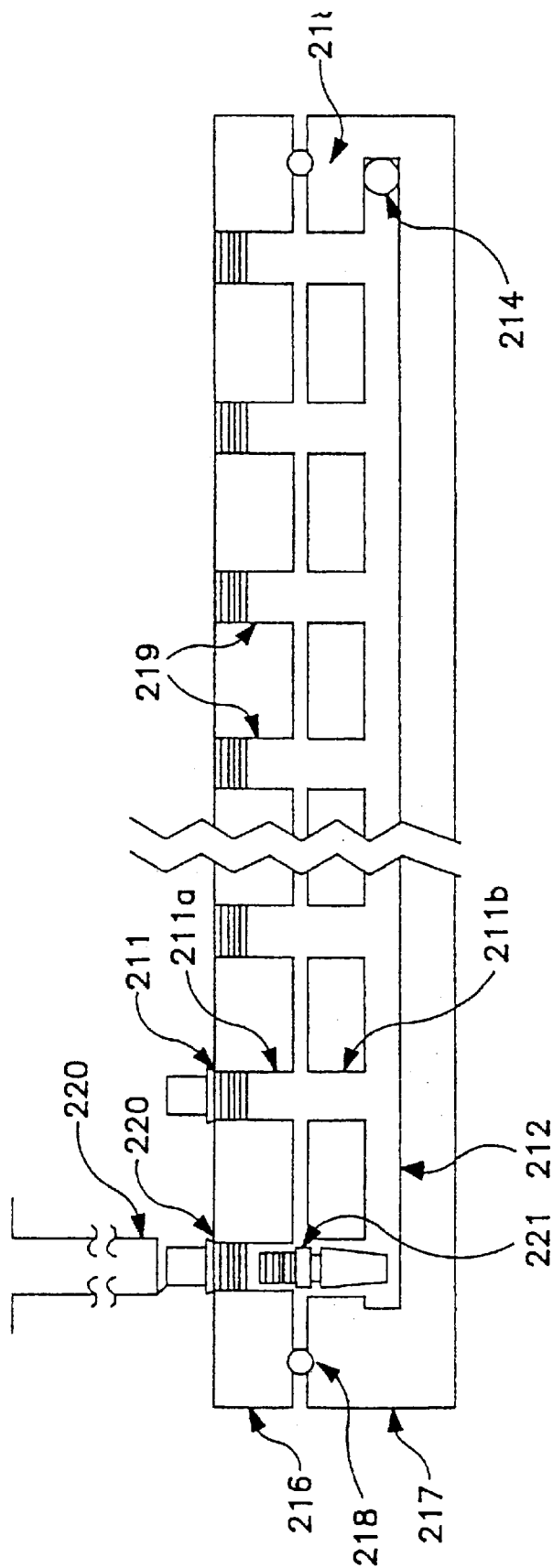
FIG. 48 illustrates a cross-sectional view of the reaction grid of FIG. 47.

FIG. 48 shows the cross-sectional view of reaction grid 210. In this figure, the two rectangular sections making up the reaction grid, i.e., top section 216 and bottom section 217, are illustrated. Top section 216 has a thickness of ½ inch, a length of 12 inches and a width of 8 inches. The dimensions of bottom section 217 are ¾"×12"×8". Positioned between top section 216 and bottom section 217 is an O-ring 218 to provide a vacuum seal between the two sections. The orientation and retention of the O-ring can be facilitated by providing a groove in either the top section 216 or bottom section 217, or both, into which the O-ring 218 will fit.

The reaction grid, as discussed in FIG. 47, exhibits a plurality of inlet ports 211. Each of the inlet ports is actually divided into two portions. A first portion of the inlet port is provided within the top rectangular section 216 and passes through the entire width of this section. This part of the inlet ports is identified as reference numeral 211a in FIG. 48. In addition, the bottom rectangular section of the reaction grid is provided with inlet port extensions 211b, each of which corresponds to an inlet port portion 211a in the top rectangular section.

The top inlet port section 211a is provided with internal threads (e.g., 10/32 thread in accordance with standard ANSI specifications). The threads permit the fastening of Luer fittings to the top and bottom of inlet port section 211a and the top rectangular section 216. As shown for one of the inlet ports 211 in FIG. 48, a female Luer connector component 20 is threaded into the top of the inlet port section 211a. Conversely, a male Luer connector component 21 is threaded into the bottom part of inlet port section 211a. These Luer connector components are provided with external threads which engage the internal threads of the inlet port section 211a. The openings of inlet port extensions 211b are preferably countersinked to accommodate the male Luer connectors in the bottom parts of inlet ports 211a.

While not shown in FIG. 48, the inlet port extensions 211b of the bottom rectangular section 217 can also be provided with internal threads. A female Luer connector component can then be threaded into the inlet port extensions. As a result, when the top rectangular section 216 equipped with the female and male Luer connector components is aligned with the bottom rectangular section 217, the male Luer connector, threaded into the bottom of inlet port sections 211a, will fit into the female Luer connectors threaded into the inlet port extensions in the bottom rectangular section 217. This provides an additional seal between the top and bottom sections of the reaction grid 210.

Again, as shown for one inlet port 211 of the reaction grid in FIG. 48, a reaction vessel is positioned through the top of the inlet port. The reaction vessel can be, for example, a polypropylene syringe such as those commercially available (e.g., standard 6 ml syringe), with a standard male Luer tip. Thus, when a reaction vessel/syringe is positioned in an inlet port, it connects with the female Luer connector threaded into the inlet port at the top of the reaction grid. The reaction vessel thus preferably comprises a syringe barrel, a filter at the bottom of the barrel, and a male Luer connector.

The female and male Luer connectors used in the reaction grid can be selected from those commercially available. For example, the male and female Luer connectors can be ANSI/HIMA-style Luers designed to the specifications of a #10–32 UNF port. The top rectangular section 216 and bottom rectangular section 217 have a thickness at least sufficient to provide structural rigidity, e.g., ⅓" or greater. In the embodiment illustrated in FIG. 48, this thickness results in a spacing within the inlet ports between the male and female Luer connectors, e.g., ⅜" or more.

The reaction grid, as well as the cleavage section and vial rack discussed infra, are preferably made of chemically resistant materials, especially those regions that will come in contact with chemical reagents and solvents during use, e.g., the reaction vessels, the interior of the Luer connectors, the interior of the inlet ports, the interior of the inlet port extensions, the channels, the main channel, vial rack, etc. The top surface of the reaction grid is also preferably made of chemically resistant materials since it may contact corrosive materials due to spillage. Preferably, the reaction vessels and the reaction grid itself are made out of polymeric chemically resistant materials, such as polypropylene, high-density polyethylene and polytetrafluoroethylene. Polypropylene is preferred.

Following completion of the reactions, the top section 216 of the reaction grid is disconnected from bottom section 217. Thereafter, top section 216 is connected to a cleavage section 250 (dimensions: 3¼"×12"33 8") having internal chambers 252 (dimensions: 2½"×10⅜"×6½") which holds an array of vials in a vial rack 232 (see FIG. 54).

Figure 49:
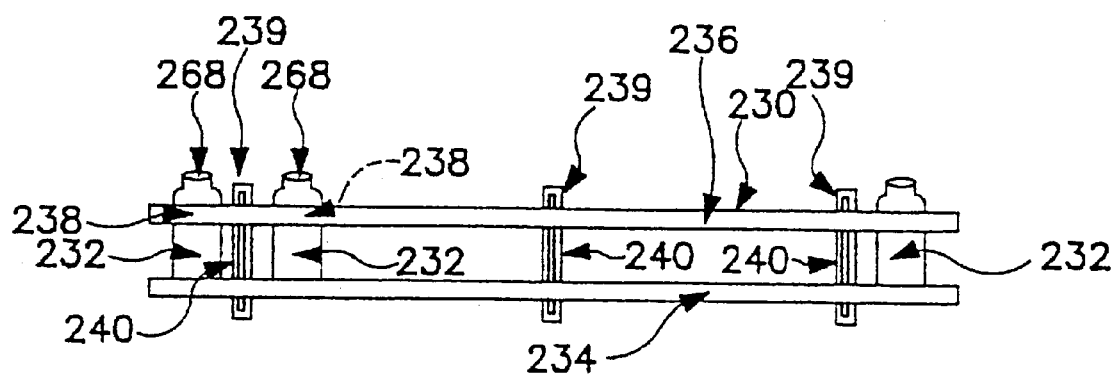
FIG. 49 is a side view of a vial rack receivable into a space defined in a cleavage block illustrated in FIGS. 51–53.
Figure 50:
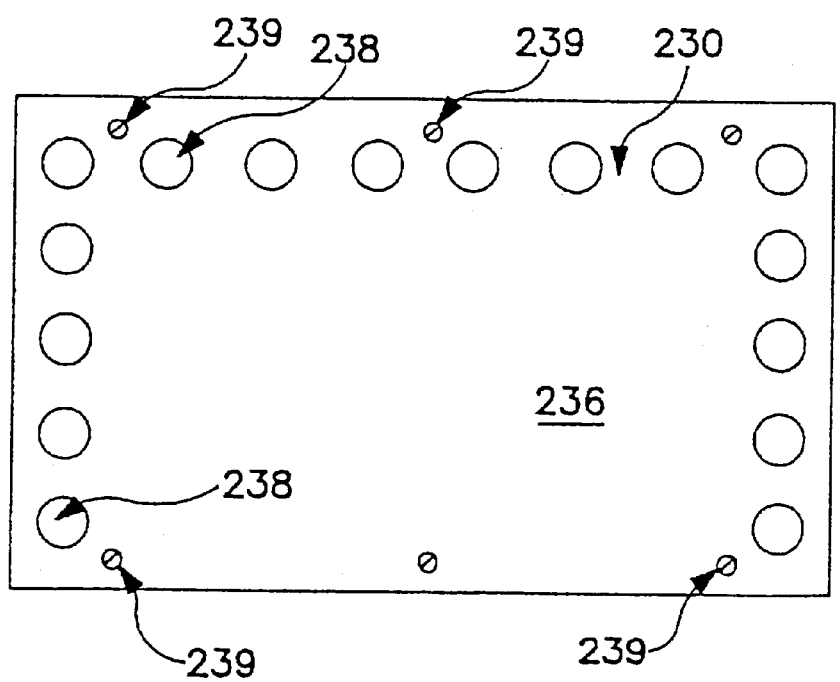
FIG. 50 is a top view of the vial rack of FIG. 49.

FIGS. 49 and 50 illustrate a vial rack 30 for holding an array of vials 232 (e.g., 1" diameter). The vials are held in an array corresponding to the array of inlet ports and reaction vessels of top section 216, e.g., an array of 8 rows of vials, each row having 5 vials so that the vial rack retains a total of 40 vials. The vial rack 230 includes a bottom plate 234 which supports the bottom of the vials. The bottom plate may be provided with depressions in which the vial bottoms sit. The rack also has a top plate 236 having a plurality of apertures 238 therein defining the array to hold vials 232, e.g., an 8×5 array to hold 40 vials. The plates 234 and 236 are held in spaced relation by rods 238 that have concentric spacers 240 received thereon which engage the top surface of the bottom plate 234 and the bottom surface of the top plate 236.

Figure 54:
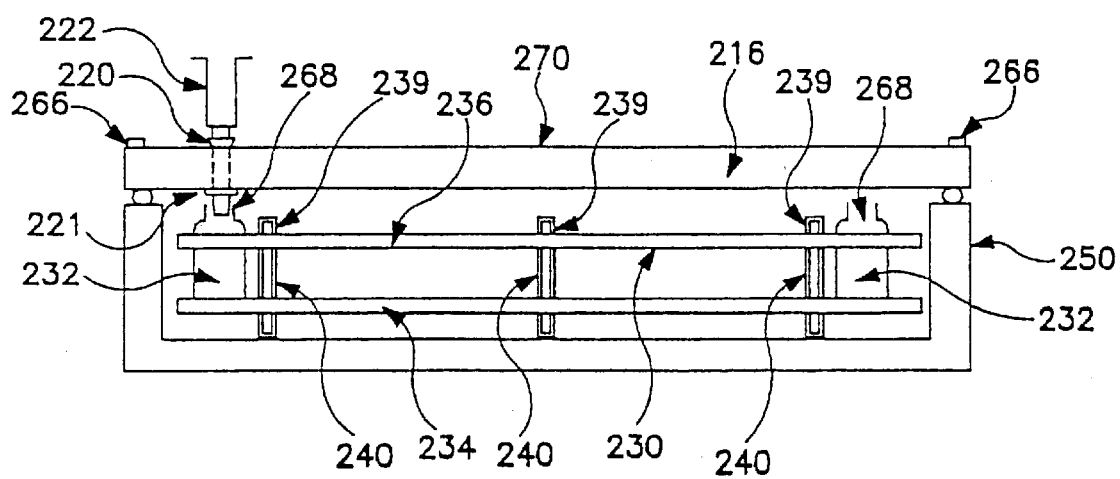
FIG. 54 is a side elevational view showing the vial rack of FIGS. 49 and 50 mounted in the cleavage block of FIGS. 51–53, with the top portion of the reaction grid of FIGS. 47 and 48 mounted on the cleavage block.

Referring now to FIGS. 51–53, a cleavage section 250, which is rectangular in shape, defines a rectangular chamber 252 which receives the vial rack 230 of FIGS. 49 and 50 as shown in FIG. 54. The cavity 252 is defined by pairs of opposed end walls 254, side walls 256 and a flat bottom 258. A port 260 in one of the opposed side walls 256 is attached to a vacuum source. Around the top edge of the walls, an O-ring seal 262 is received in a groove 264 to provide a seal with the bottom surface of top section 216 of the reaction grid of FIG. 48 as is seen in FIG. 54. The groove for receiving the O-ring can instead be provided in the bottom surface of reaction grid top section 216. Alternatively, grooves for the O-ring can be provided in both section 216 and section 250.

Referring now more specifically to FIG. 54, it is seen that the reaction grid top section 216 is, for example, bolted by bolts 266 to the cleavage section 250 with mouths 268 of the vials 232 aligned with the male Luer connectors 221. The vial rack 230, cleavage section 250 and reaction grid top section 216 combine in FIG. 54 to form a cleavage block assembly 270.

The assembly of FIG. 54 has a length of about 12 inches, a width of about 54 inches and a height of about 4 inches. Each of the vials has a diameter of approximately 1 inch. Preferably, the cleavage section 250 and reaction grid top section 216 are machined from separate blocks of a polymeric material such as polypropylene.

In use, the cleavage block permits the chemical template to be cleaved from its solid support by exposure to a chemical cleavage reagent. Therefore, a given volume of the cleavage reagent solution is added to each reaction vessel 232 and the apparatus shaken for a selected period of time. After this agitation ceases, a vacuum is applied through the vacuum port 260 to the cleavage section 250. Liquid from each reaction vessel 220 now drains into individual vials 232. The vials 232 are aligned to connect the male Luer connectors 221 from the reaction grid top section 216. In this operation, there are no fluid connections between the individual ports. Accordingly, the individual chemical templates are isolated as discrete chemical targets in a matrix synthesis.

In order to provide the evaporated chemicals, the rack 230 containing the vials 232 is removed from the cleavage section 250 and placed in an apparatus such as a freeze-dryer (not shown).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLE

Example 1

Manufacture of Reaction Grid and Cleavage Block

Manufacturing of the rectangular reaction grid begins with two blocks of polymeric material, e.g., polypropylene, which are machined into a 0.5 inch thick piece and a 0.75 inch thick piece, both pieces having a length of 12" and a width of 8". Thereafter, holes are drilled into the top section and threaded to the desired specification, thereby providing the inlet ports 11. Female and male Luer connectors are threaded into the top and bottom of the threaded inlet holes, respectively.

In the bottom section, the inlet port extensions or drain holes are first drilled into the top side. These holes can be recessed so as to accommodate the hex nut portion of the male Luer connector threaded into the bottom of the inlet port in the top section. After the inlet port extensions are drilled into the top surface, the drainage channels are drilled into the bottom portion through the side wall. For example, in the embodiment illustrated in FIG. 48, five long drainage channels are drilled through the side of the block, each drainage channel connecting the eight holes that are arranged in a row and drilled through the top surface of the bottom section. Thereafter, at the end of one of the adjacent side walls, a main drainage channel is drilled through, connecting each of the five individual drainage channels. The drill holes for the five individual drainage channels in the side wall are then each plugged with a small screw. As a result, the 40 holes drilled through the top surface of the bottom section are all in fluid communication with a single outlet port which is the drill hole through the side wall for the main drainage channel. A groove is then provided in the top surface of the bottom section, the bottom surface of the top section, or both, and an O-ring positioned therein. The O-ring is made of a chemically inert polymer such as a nitrile polymer. The top and bottom sections are then connected together in accordance with any type of any suitable fastening technique, such as clamps, bolts, adhesives, etc.

The vial rack is constructed out of two polymeric plates, preferably polypropylene. Holes are drilled through the top plate to provide an array of perforations to hold vials. The top and bottom plates are then connected with another by six bolts provided with spacer means to maintain a space between the two plates.

The cleavage section is prepared by machining a separate block of polymeric material, e.g., polypropylene to a thickness, length and width of, respectively, 3¼", 12" and 8". The block is then hollowed out using conventional procedure to provide an internal chamber with a depth, length and width of, respectively, 2½", 10⅜" and 6½".

Example 2

Solid Phase Chemical Synthesis (General)

The reaction grid is used to perform multiple solid phase chemical synthesis of organic molecules in a matrix format. In the embodiment illustrated in FIG. 48, the syringe barrel of each syringe acts as a reaction vessel or reaction flask. The reaction vessels are filled with solid support resins and chemical templates are attached thereto via appropriate linkers. Subsequently, chemicals are added to the reaction vessels through the top of the syringe barrel, thereby permitting chemical transformations and reactions to occur on the templates attached to the solid support beads. The sealed reaction grid and filters used in the syringes prevents chemical reagents from leaking through the syringe barrels during the reaction cycles.

After a desired chemical transformation has been performed, the beads are rinsed free of excess chemicals in a wash cycle by the application of vacuum to the block. The vacuum source is connected to the block through the outlet port. This allows liquid waste to drain from each of the reaction vessels through the inlet holes into the drainage channel and then to the main channel and finally into a waste trap. Subsequently, the beads are then washed repeatedly with wash solvent and again the waste removed by suction via the outlet connection port connected to the vacuum source.

Following completion of the transformations in each of the reaction vessels and the washing and rinsing of the solid support resin, the top section of the reaction block is removed from the bottom section. Thereafter, the top section is connected to a different bottom piece to form an additional assembly called a cleavage block. In this assembly, the bottom portion has individual receptacles corresponding to the number of reaction vessels/inlet ports in the array in the top section. Thus, in an 8×5 matrix design, there are 40 individual vials or test tubes positioned within the cleavage block.

In comparing the bottom section of the cleavage block to the bottom section of the reaction grid, the cleavage block bottom section is a hollow block containing individual receptacles for the chemical products either in a tray or as a molded microtiter plate. The top section of the cleavage block is the same top section of the reaction grid. In the cleavage block, as in the reaction grid, the top sections and bottom sections are sealed to one another using an O-ring positioned therebetween. The male Luer connectors positioned in the bottom surface of the top section function as spouts in the cleavage block, draining into individual chambers rather than into connected drains as in the case of the reaction grid.

Example 3

Solid Phase Chemical Synthesis (Specific Example)

The following is a solid phase synthesis procedure for the synthesis of a library of 40 quinazoline analogs. These analogs are synthesized in an 8×5 matrix starting from a common anthranilic acid precursor. Treatment with 5 unique isocyanates and 8 unique alkylating agents provides 40 unique compounds.

Solid Phase Organic Synthesis of 1,3-Dialkyl-2,4-Quinazoline Diones

Example of Solid Phase Synthesis of Quinazoline Analogs Using the Reaction Grid Assembly

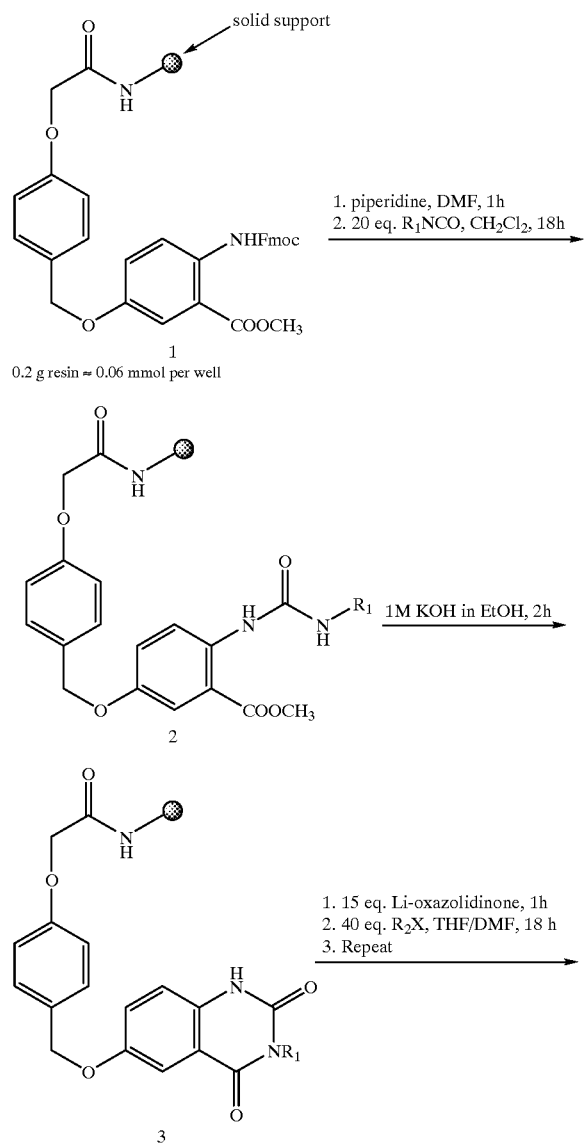

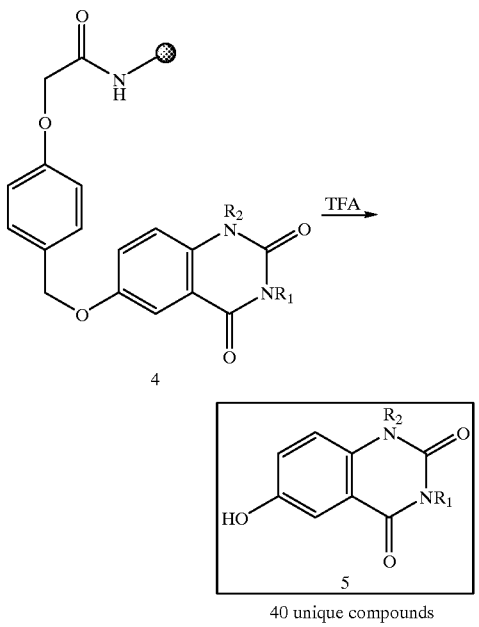

40 unique compounds

Polymer (Tentagel-S NH$_2$) supported anthranilic acid derivative 1 is slurried in dimethyl formamide (DMF) and transferred to 40 individual reaction vessels 232 in an 8×5 matrix format (0.20 g, 0.06 mmol per vessel in 2 mL DMF). Piperidine (0.5 mL) is added to each vessel and the vessels are shaken for 1 h. The reaction grid assembly 10 is connected to a vacuum source via port 214 and the reaction solution is filtered away. DMF (2 mL) is added to each vessel 232 and the vessels are shaken for 5 min., then drained via vacuum as described above. This rinsing step is repeated three times. Methylene chloride (2 mL) is added to each vessel 232 and the vessels are shaken for 5 min., then drained via vacuum as described above. This rinsing step is repeated three times.

Methylene chloride (2 mL) is added to each vessel 232 and individual isocyanates (R$_1$) are then added to each vessel (5 different reagents, 1.16 mmol, 20 equivalents). The reaction grid assembly 210 is shaken for 18 hours to carry out the chemical transformation. Then the agitation is stopped, the vacuum port 214 of the reaction grid assembly 210 is connected to a vacuum source and the reaction solution filtered. Methylene chloride (2 mL) is added to each vessel 232. The reaction grid assembly 210 is shaken for 5 min. and then drained via vacuum as described above. This rinsing step is repeated three times. Ethanol (2 mL) is added to each vessel 232 and the assembly 210 is shaken for 5 min., then drained via vacuum as described above. This rinsing step is repeated three times. This operation now provides 5 unique urea derivatives 2.

1M Potassium hydroxide in ethanol (2 mL) is added to each vessel 232 and the assembly 210 shaken for 1 hour. The assembly 210 is connected to vacuum and the reaction solution is filtered away. Ethanol (2 mL) is added to each vessel 232 and the reaction grid assembly 210 is shaken for 5 min., then drained via vacuum as described above. This rinsing step is repeated three times. Tetrahydrofuran (2 mL) is added to each vessel 232 and the reaction grid assembly 210 is shaken for 5 min., then drained via vacuum as described above. This rinsing step is repeated three times. This operation now provides 5 unique monoalkylquinazolines 3.

Tetrahydrofuran (1 mL) is added to each vessel 232 followed by lithium benzyloxazolidinone (3 mL), 0.3 M in tetrahydrofuran, 0.90 mmol, 15.5 equivalents). The vessels are shaken for 1.5 hours. A different alkylating reagent (R$_2$) is now added down each of the 8 columns of the 8×5 grid. (8 different alkylating reagents, 2.32 mmol, 40 equivalents). DMF (1 mL) is added to each vessel 232 and the vessels are shaken for 18 hours then the reaction grid assembly 210 is connected to vacuum via port 214 and the reaction solution is filtered away. The addition of lithium benzyloxazolidinone and alkylation agents is then repeated as described above. Tetrahydrofuran (2 mL) is added to each vessel 232 and the vessels are shaken for 5 min., then drained via vacuum as described above. This rinsing step is repeated three times. 50% Tetrahydrofuran in water (2 mL) is added to each vessel and the vessels are shaken for 5 min., then drained via vacuum as described above. This rinsing step is repeated three times. Tetrahydrofuran (2 mL) is added to each vessel 232 and the vessels are shaken for 5 min., then drained via vacuum as described above. This rinsing step is repeated three times. This operation now provides 40 unique dialkyl quinazolines 4, one in each reaction vessel 232, attached to the solid support.

The top section 216 with the attached reaction vessels is separated from bottom section 217 and attached to cleavage section 250 to form the cleavage block assembly. A vial rack 230 is positioned within chamber 252 of cleavage section 250. 95% Trifluoroacetic acid in water (2 mL) is added to each vessel 232 and the vessels are shaken for 3 hours. A vacuum source is attached to vacuum port 260 and the vessels 232 are filtered into 240 separate vessels, diluted with water and lyophilized to provide 40 unique dialkyl quinazolines 5.

Solid Phase Organic Synthesis of 1,3-Dialky1-2,4-Quinazoline Diones
Example of Solid Phase Synthesis of Quinazoline Analogs Using the Reaction Grid Assembly
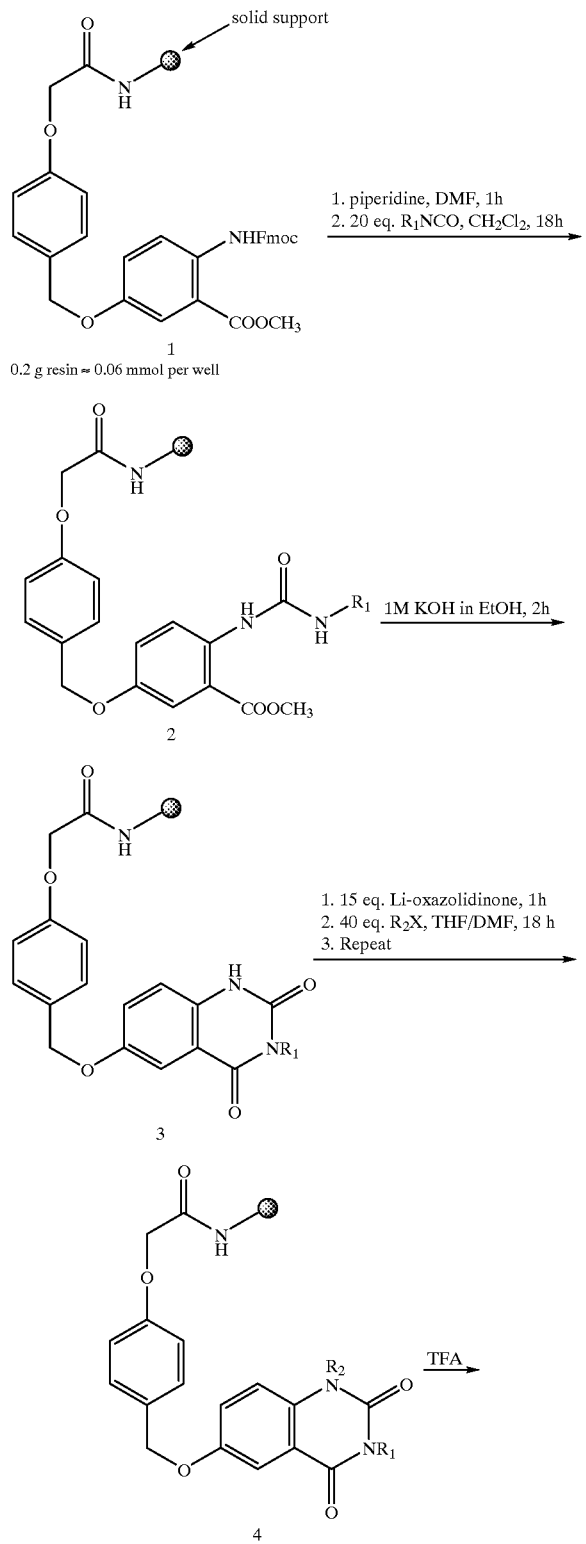

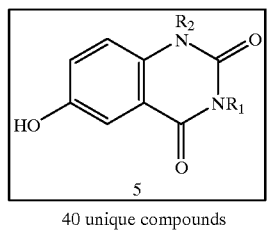

40 unique compounds

Polymer (Tentagel-S NH$_2$) supported anthranilic acid derivative 1 is slurried in dimethyl formamide (DMF) and transferred to 96 individual reaction vessels 12 in an 8×12 matrix format (0.20 g, 0.06 mmol per vessel in 2 mL DMF). Piperidine (0.5 mL) is added to each vessel and the vessels are shaken for 1 h. The reaction grid assembly 14 is connected to a vacuum source via line 36 and the reaction solution is filtered away. DMF (2 mL) is added to each vessel 12 by using the washing system 21 of FIGS. 1, 20, 22, 41–44 and 46, and the vessels are shaken for 5 min., then drained via vacuum as described above using the drainage system of FIG. 45. This rinsing step 35 is repeated three times. Methylene chloride (2 mL) is added to each vessel 12 and the vessels are shaken for 5 min., then drained via vacuum as described above. This rinsing step is repeated three times again using the washing system 21 and the drainage system 35 provided by the manifold.

Methylene chloride (2 mL) is added to each vessel 12 and individual isocyanates (R$_1$) are then added to each vessel (8 different reagents, 1.16 mmol, 20 equivalents). The reaction grid assembly 14 is shaken for 18 hours to carry out the chemical transformation. Then the agitation is stopped, the vacuum port 68 of the reaction grid assembly 14 is connected to a vacuum source and the reaction solution filtered. Methylene chloride (2 mL) is added to each vessel 12 using the fluid handling manifold 20. The reaction grid assembly 14 is shaken for 5 min. and then drained via vacuum as described above using the drainage system 35. This rinsing step is repeated three times. Ethanol (2 mL) is added to each vessel 12 and the assembly 14 is shaken for 5 min., then drained via vacuum as described above. This rinsing step is repeated three times using the washing and drainage system 27 and 35. This operation now provides 8 unique urea derivatives 2.

1M Potassium hydroxide in ethanol (2 mL) is added to each vessel 12 and the assembly 10 shaken for 1 hour. The assembly 14 is connected to vacuum and the reaction solution is filtered away. Ethanol (2 mL) is added to each vessel 12 and the reaction grid assembly 14 is shaken for 5 min., then drained via vacuum as described above. This rinsing step is repeated three times using the washing and drainage systems 27 and 35, respectively. Tetrahydrofuran (2 mL) is added to each vessel 12 and the reaction grid assembly 10 is shaken for 5 min., then drained via vacuum as described above. This rinsing step is repeated three times. This operation now provides 8 unique monoalkylquinazolines 3.

Tetrahydrofuran (1 mL) is added to each vessel 12 followed by lithium benzyloxazolidinone (3 mL), 0.3 M in tetrahydrofuran, 0.90 mmol, 15.5 equivalents). The vessels are shaken for 1.5 hours. A different alkylating reagent (R$_2$) is now added down each of the 12 columns of the 8×12 grid. (12 different alkylating reagents, 2.32 mmol, 96 equivalents). DMF (1 mL) is added to each vessel 12 and the vessels are shaken for 18 hours then the reaction grid assembly 14 is connected to vacuum via port 68 and the reaction solution is filtered away. The addition of lithium benzyloxazolidinone and alkylation agents is then repeated as described above. Tetrahydrofuran (2 mL) is added to each vessel 12 and the vessels are shaken for 5 min., then drained via vacuum as described above. This rinsing step is repeated three times. 50% Tetrahydrofuran in water (2 mL) is added to each vessel and the vessels are shaken for 5 min., then drained via vacuum as described above. This rinsing step is repeated three times. Tetrahydrofiran (2 mL) is added to each vessel 12 and the vessels are shaken for 5 min., then drained via vacuum as described above. This rinsing step is repeated three times. This operation now provides 96 unique dialkyl quinazolines 4, one in each reaction vessel 12, attached to the solid support.

The manifold valve block 30 with the attached reaction vessels 12 is separated from the channel block 34 and attached to cleavage block 120 to form the cleavage block assembly. A vial rack 122 or 140 is positioned within chamber 123 of cleavage block 120. 95% Trifluoroacetic acid in water (2 mL) is added to each vessel 12 using the fluid handling system 21 and the reaction vessels 12 are shaken for 3 hours. A vacuum source 38 is attached to vacuum port 160 of the cleavage block and the vessels 12 are filtered into 96 separate vessels, diluted with water and lyophilized to provide 96 unique dialkyl quinazolines 5.

Throughout this example, the washing and drainage systems 27 and 35, respectively, the reaction grid assembly 14 and the vortexer 18 are utilized to form the reaction products in the reaction vessels 12.

The preceding examples can be repeated with similar success by substituting the generically or specifically described reactants and/or operating conditions of this invention for those used in the preceding examples.

What is claimed is:

1. A manifold block assembly useful for supporting an array of reaction vessels, the manifold block comprising:

a block of resinous material having an upper surface, a lower surface and side surfaces;

an array of vertically extending first passages within and extending through the block from openings at the upper surface to openings at the lower surface, the openings being adapted to receive reaction vessels;

valve inserts extending through for allowing fluid from reaction vessels to flow through the first passages when open and for preventing fluid from flowing through the first passages when closed; each valve having an upper end for receiving an outlet of a reaction vessel and a lower end for dispensing fluid from the reaction vessel;

an array of transverse second passages extending in a direction transverse to the first passages with and through the block, each transverse second passage intersecting the valve inserts in a plurality of first passages, rods extending in the second passages and passing through the valve inserts for openig and closing valve inserts simultaneously, whereby the flow of fluid from a plurality of the reaction vessels out through the outlets in the lower surface of the block is controlled simultaneously.

2. The assembly of claim 1 and further comprising:

a capping assembly attached to the manifold block in spaced relation thereto, the capping assembly sealing inlets of the reaction vessels when the reaction vessels are mounted in the inlets of the manifold block.

3. The assembly of claim 1 further comprising:

a drainage block attachable to the lower surface of the manifold block, the drainage block having at least one cavity therein for receiving fluid from the reaction vessels when fluid in the reaction vessels flows from the outlets in the manifold block.

4. The assembly of claim 3, wherein drainage block has interconnected channels therein aligned with the outlets of the manifold block.

5. The assembly of claim 4 further including:

a capping assembly attached to the manifold block in spaced relation thereto, the capping assembly sealing inlets of the reaction vessels when the reaction vessels are mounted in the inlets of the manifold block.

6. The assembly comprising the manifold block of claim 1, wherein the upper end of each valve insert is a female Luer connection and the lower end of each valve insert is a male Luer connection.

7. The assembly of claim 6, wherein the rods each have a plurality of similarly oriented holes therethrough which when aligned with the female and male Luer connections allow the valve inserts to open.

8. The assembly of claim 7 further including a drainage block attachable to the lower surface of the manifold block, the drainage block having at least one cavity therein for receiving fluid from the reaction vessels when fluid in the reaction vessels flows from the outlets in the manifold block.

9. The assembly of claim 8, wherein drainage block has interconnected channels therein aligned with the outlets of the manifold block.

10. The assembly of claim 8 further comprising:

a capping assembly attached to the manifold block in spaced relation thereto, the capping assembly sealing inlets of the reaction vessels when the reaction vessels are mounted in the inlets of the manifold block.

11. The assembly comprising the manifold block of claim 1 and further comprising:

a thermal block held spaced from the manifold block for surrounding the reaction vessels when the reaction vessels are mounted in the inlets of the manifold for controlling the temperature of contents within the reaction vessels.

12. The assembly of claim 11 further including:

a drainage block attachable to the lower surface of the manifold block, the drainage block having at least one cavity therein for receiving fluid from the reaction vessels when fluid in the reaction vessels flows from the outlets in the manifold block.

13. The assembly of claim 7 further including:

a capping assembly attached to the manifold block in spaced relation thereto, the capping assembly sealing inlets of the reaction vessels when the reaction vessels are mounted in the inlets of the manifold block.

14. The assembly of claim 1 further comprising:

an agitation device for agitating the contents of the reaction vessels.

15. The assembly of claim 14, wherein the agitation device is a vortexer.

16. The assembly of claim 6 further comprising:

a vial retaining member for coupling to the lower surface of the manifold block and for holding a plurality of vials in alignment with the outlets of the manifold block.

17. The assembly of claim 16, wherein the vial retaining member is a cleavage block having a cavity therein in which the vials are received.

18. The assembly of claim 17 further comprising:

a capping assembly attached to the manifold block in spaced relation thereto, the capping assembly sealing inlets of the reaction vessels when the reaction vessels are mounted in the inlets of the manifold block.

19. The assembly of claim 17 further comprising:

a thermal block held spaced from the manifold block for surrounding the reaction vessels when the reaction vessels are mounted in the inlets of the manifold for controlling the temperature of contents within the reaction vessels.

20. The assembly of claim 19, wherein the valves are valve inserts in each of the first passages.

21. The assembly of claim 20, wherein the valve operators extending in each of the second passages simultaneously operate valve inserts in the first passages.

22. The assembly of claim 19 further comprising:

a capping assembly attached to the manifold block in spaced relation thereto, the capping assembly sealing inlets of the reaction vessels when the reaction vessels are mounted in the inlets of the manifold block.

23. The assembly of claim 22, wherein the valves are valve inserts in each of the first passages.

24. The assembly of claim 23, wherein the valve operators extending in each of the second passages simultaneously operate valve inserts in the first passages.

* * * * *